United States Patent [19]
Mitchell et al.

[11] Patent Number: 5,872,973
[45] Date of Patent: *Feb. 16, 1999

[54] METHOD FOR MANAGING DYNAMIC RELATIONS BETWEEN OBJECTS IN DYNAMIC OBJECT-ORIENTED LANGUAGES

[75] Inventors: David C. Mitchell, South Orem; Kelly L. Anderson, Provo; Andrew V. Osman, Provo; Dale K. Mitchell, Provo, all of Utah

[73] Assignee: Viewsoft, Inc., Provo, Utah

[ * ] Notice: This patent issued on a continued prosecution application filed under 37 CFR 1.53(d), and is subject to the twenty year patent term provisions of 35 U.S.C. 154(a)(2).

[21] Appl. No.: 548,536

[22] Filed: Oct. 26, 1995

[51] Int. Cl.$^6$ .................................................. G06F 9/44
[52] U.S. Cl. ........................... 395/685; 395/683; 395/702
[58] Field of Search ...................... 395/685, 710, 395/614, 683, 701, 702, 708; 364/284.4; 707/103

[56] References Cited

U.S. PATENT DOCUMENTS

| | | | |
|---|---|---|---|
| 5,327,562 | 7/1994 | Adcock ..................................... | 395/700 |
| 5,339,430 | 8/1994 | Lundin et al. ........................... | 395/700 |
| 5,359,721 | 10/1994 | Kempf et al. ............................ | 395/425 |
| 5,367,633 | 11/1994 | Matheny et al. ......................... | 395/164 |
| 5,369,766 | 11/1994 | Nakano et al. ........................... | 395/700 |
| 5,371,891 | 12/1994 | Gray et al. ............................... | 395/700 |
| 5,418,964 | 5/1995 | Lonner et al. ........................... | 395/700 |
| 5,423,841 | 6/1995 | Bunke et al. ............................. | 395/700 |
| 5,437,025 | 7/1995 | Bale et al. ................................ | 395/600 |
| 5,485,671 | 1/1996 | Stutz et al. ............................... | 395/700 |
| 5,515,536 | 5/1996 | Corbett et al. ........................... | 395/700 |
| 5,619,638 | 4/1997 | Duggan et al. ........................... | 395/703 |

OTHER PUBLICATIONS

Huy Hguyen et al., *OODDM: An Object–Oriented Database Design Model*, Apr., 1990, see page 339, right–hand column, line 35; and page 341, left–hand column, line 2.

C. Popien et al., *A Concept For An ODP Service Management*, IEEE, 1994, see pages 888–897.

Cheng et al, "On The Performance Issues of Object–Based Buffering", Proceedings of the First International Conference on Parallel and Distributed Information Systems, p. 30–37, 4 Dec. 1991.

*Primary Examiner*—James P. Trammell
*Assistant Examiner*—Kakali Chaki
*Attorney, Agent, or Firm*—Wilson Sonsini Goodrich & Rosati

[57] ABSTRACT

A method and system for creating named relations between classes in a dynamic object-oriented programming environment via mappers is disclosed. The mapping objects dynamically bind to the class interfaces of the classes being related. These connections between classes are defined within a visual environment. The relationships can be programmatically attached by name to object instances during program execution. Because these relationships are stored in a resource and are dynamically bound by name to the objects, they can be created and modified without requiring the source code of the objects being associated to be changed. This eliminates hard coded dependencies between objects that impede reuse of the objects in other contexts. The invention requires and takes full advantage of, metadata, full dynamic binding and probing support in the objects being connected with the invention.

33 Claims, 4 Drawing Sheets

METHOD FOR MANAGING DYNAMIC RELATIONS BETWEEN OBJECTS IN DYNAMIC OBJECT-ORIENTED LANGUAGES

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Various trademarks are referred to in the disclosure. These trademarks belong to their trademark holders.

FIELD OF THE INVENTION

The present invention relates generally to the field of object-oriented programming and more specifically to structures and methods for dynamically creating relations between objects in an object oriented language during program execution without requiring special behavior on the parts of the objects themselves.

BACKGROUND OF THE INVENTION

Object-oriented programming

Human intellectual capacity is exceeded by the complexity of most modern systems. This creates the need for computers and software. The fundamental task of software developers is to create the illusion of simplicity—to shield users from vast and often arbitrary external complexity. Programming transfers the routine handling of complexity from those who work with real-world systems to programmers who simulate these systems within computers. The problems are made no less complex by being moved inside of a computer. Only complex computer programs can solve problems that are complex in the real world.

When creating complex software systems, programmers suffer the same intellectual limits as other humans. It is therefore essential for programmers to decompose complex systems into smaller and smaller parts or modules, each of which may then be understood and refined independently. The fundamental task for developers of software tools then is to control and contain the inherent complexity of software.

Structured programming and top-down design typify the previous generation of modular program design. Using this approach, processes or algorithms are broken down into simpler and simpler sub-processes. These processes are then implemented and strung together like beads on a string to accomplish the complex overall task.

Object-oriented programming (OOP) also strives to decompose complex systems into more manageable subsystems. Object-oriented programmers, however, view the world as a set of autonomous agents that collaborate to perform some higher level behavior. Only through the construction of meaningful collections of these agents is higher-level functionality achieved. When the behavior of the whole is greater than the sum of its parts this is emergent behavior. This gestalt is a powerful benefit of OOP. Simple collections of disconnected objects have little value. The valued added by a system comes from the relationships between the parts, not from the parts per se. Because of its method of non-linear decomposition, OOP is better suited to the random input encountered in a mouse and windows type interface.

More information on object-oriented design and programming is given in "Object-Oriented Analysis and Design with Applications—$2^{nd}$ ed.", by Grady Booch, (The Benjamin/Cummings Publishing Company, Inc., 1994. ISBN: 0-8053-5340-2) which is incorporated herein by reference.

Code Reuse

Because of the expense and effort involved in creating objects from scratch, reusing pre-built objects is highly desirable. In fact, the goal of programming complex applications by assembling reusable building blocks is nearly as old as computer science itself Attempting to emulate the reusability of erector sets, "Lego®", "Tinker-Toys®" and electronics components, computer scientists have endeavored to create generic components from which more elaborate structures can be built up. While there has been some success in reuse, most programmers believe that there is still a long way to go.

Object-oriented programming has grown out of an effort to create computer languages that can more accurately model the way people naturally think about real world systems and objects. When objects in programs more accurately reflect objects in the real world, then the programming objects are more likely to be reusable in other contexts for which models of those real world objects are required. When programming objects contain elements that are extraneous to the real world object being modeled, then those extraneous portions may impede object reuse by creating dependencies that are not germane to the model.

Dependencies

An object in isolation is intensely uninteresting. To produce satisfactory emergent behavior, objects must collaborate. Objects collaborate through relationships called links. A link is a physical or conceptual connection between objects. A link denotes the specific association through which one object (the client) petitions the services of another object (the server). For each link, there is a client (the object that requests the transaction) and a server (the object that services the client's requests).

The server object must be visible to the client. This is typically accomplished in one of four methods: 1) The server object is global to the client, 2) The server object is a parameter to some operation of the client. 3) The server is part of the client or 4) The server is a locally declared object in some operation of the client.

Whenever one object passes a message to another across a link, the two objects are said to be synchronized. Synchronization of objects through links is the heart of an object-oriented program and the source of emergent behavior.

It is important to note that all four types of links mentioned above require the client object to write code calling the application programming interface (API) of the server object. In other words, clients are not independent of servers. In practical terms, this means that the client cannot be reused without also reusing the server. This reduces the reusability of the client object. Typically, an object will rely on the utilities of several server objects. Connecting to multiple servers has a cumulative effect of reducing reusability even further. This is because it becomes more likely that at least one of the servers will not be desirable in the new context. When servers are also clients, a web of dependencies is created throughout the program.

The impact of these dependencies on the code of the client objects can be reduced through the use of callbacks and virtual functions.

Callbacks are functions with a generic interface, often involving void pointers, that allow for the server to call the client back when something of interest happens. Callbacks keep the server from developing a dependency on the client since the client sets it up.

Virtual functions allow a subclass server to specialize the behavior of a base server without the client creating a dependency on the subclass server. Nevertheless, the client still has a dependency on the base class server. Callbacks and virtual functions can increase reusability of classes, but cannot entirely address the problem of dependencies without Herculean efforts. The end result is that reusability of these objects is impacted negatively because clients are required to be cognizant of servers to be able to access their services.

The Tradeoff

The desire to maintain object independence is strong for those wishing to employ object reuse. Most objects that are reused today are server objects. Many objects are both clients and servers. These objects cannot be reused as servers without bringing along all of the other objects on which they depend as clients. It is therefore desirable to reuse a client object as a server in another context without requiring that its servers be brought along.

In practice, reuse is made more difficult because linking object together is required in order to achieve the promised emergent behavior. Unfortunately, in today's most popular object-oriented languages, such as C++, all of these links must be hard coded, creating dependencies. The tension between object collaboration and object reuse is only partially resolvable, and then only by highly skilled object-oriented programmers. Most programmers aren't fully aware that the problem exists, even fewer can elucidate it, and virtually none address it on a daily basis. This is due mostly to limitations in the programming languages and paradigms that are commonly used and taught today.

Desirable Object-Oriented Features

C++ supports popular object-oriented features such as single and multiple inheritance, polymorphism, encapsulation, messaging, and data abstraction. These features are well described elsewhere so there is no need to redefine them here. Refer to "The C++ Programming Language ($2^{nd}$ edition)" by Bjarne Stroustrup (Addison Wesley—ISBN 0-201-53992-6) or "C++ Primer ($2^{nd}$ edition)" by Lippman, Stanley B. (Addison Wesley—ISBN 0-201-54848-8) which are incorporated herein by reference. These object-oriented language features are useful for solving large classes of common problems faced by programmers, however, they don't go far in averting the hard coded links between classes indicated previously. The hard coded dependencies required for object collaboration in C++ reduce the opportunity for object reuse.

Four features not currently available in C++, but implemented in some other object-oriented languages (and required as prerequisites for this invention) are:

meta-data (also referred to as introspection, reflection or run-time type information (RTTI)), full dynamic binding (also referred to as run-time or dynalink binding), probing (also referred to as left-monitored variables or write barriers), and instantiation of default objects by class name (also referred to as a generic factory method).

While not necessarily completing the object oriented programmer's dream list, these object oriented language enhancements enable powerful programming techniques to be applied that are not feasible without them. These enhancements used together with a system such as that described herein enable objects to collaborate without sacrificing their independence, facilitating object reuse and reducing program complexity.

Meta-Data is a database available at runtime (during program execution) that describes the classes used to build the program. It enables objects to be "self-describing" at runtime. When meta-data is extensible this creates an opportunity to have class wide read-only data that may be application specific. This application specific meta-data is called properties, and is an important language feature that is fully utilized in the invention. However, in language systems lacking extensible meta-data, property information can be easily stored in other data structures.

Full dynamic binding means that an object can be manipulated at runtime using only the names of its members. For example, attributes (fields or member fields in C++) can be set and queried, and functions can be called by name. Normal linking reduces the name to a machine address, and the name is lost from use to the program.

Probes are callback functions that are invoked when data (typically an object attribute) changes.

The ability to instantiate objects by name is also necessary for the complete implementation of the invention although this is easily implemented in languages that do not support it as a built in feature. Appendices A, B, C and D contain more lengthy discussions of these four object-oriented language features. Patent application Ser. No. 08/421,400 describes a method for enhancing languages (such as C++) that lack these features without changing the definition of the language and is incorporated herein by reference.

Together, these language features provide objects with the ability to have dynamically reconfigurable input and output during program execution without requiring special behavior on the part of the objects themselves. The term "dynamic language" is defined to mean a language that supports, or has been enhanced to support meta-data, full dynamic binding and probes.

Object Systems

There are many systems for creating dynamic "objects". These systems are referred to as "component-based" systems. There are platform object systems such as OLE (comprised of Microsoft's COM and OLE Automation) and OpenDoc (comprised correspondingly of IBM's SOM and Apple's Open Scripting Architecture) for the desktop, and Hewlett Packard's ORB+, Iona's ORBIX, NeXT's PDO and Sun's DOE for distributed applications. There are language based systems such as ViewSoft's Enhanced Object System (EOS), StepStone's Objective C and various SmallTalk implementations. There are dynamic linking systems such as Microsoft's DLLs and various flavors of unix shared libraries. There are also dynamic object systems designed for specialized requirements (e.g.—Lotus Notes for groupware and the SQL3 object model for databases). Finally, there are object systems that come built into applications such as Microsoft's VBX object system, Powersoft's PowerBuilder object system, the Novell AppWare Bus, etc.

In all of these systems, a "component" is a server object that is accessible via a dynamic interface during program execution. In most of these systems, the client must be especially written with the component system in mind, although in some of them (EOS, SmallTalk, PDO, DLL) client code is no different than when accessing another normal language based object; the system takes care of dynamically linking to the object. Often the dynamic linking is implemented in a language independent fashion, although they tend to do things as an object-oriented language would.

Some component systems allow callback architectures so that a client can install itself as a server for the component; in this way bi-directional communications may be established although the client typically has to provide a callback function, code to initialize the server with the callback and, in some cases, messages from the server must be decoded and dispatched by the client. Nevertheless, the rising popularity of these dynamic component based systems validates the basic approach of dynamically linking to components.

The ease with which one can create clients and components (server objects) in these systems ranges from trivial to fairly difficult.

Creating synchronizing links between two pure server components, (ie. comunication from one server to another server) requires creating client code that knows about both server objects. If the communication between the server objects is to be bidirectional, it requires the client to establish callbacks from both the servers or less elegantly code to poll the servers periodically. This client code is very specific to the task at hand, and is almost certainly non-reusable. If the client needs to transform information in order to make it suitable for both server objects, additional code will need to be written.

What is universally lacking in these component systems is a consistent method for creating generic clients that can dynamically attach to two server objects in such a way that the servers synchronize without creating dependencies on one another.

Client/Server Networking

Individual PCs or workstations connected via networking hardware and software such as local area networks (LANs) such as is incorporated in Microsoft's Windows 95® and Novell Netware, or on wide area networks (WANs) such as the internet are commonly available at this time. Many programs are made more efficient and useful by being distributed over networks. That is, if some of the objects in a program were on one machine and other objects were on a plurality of other machines, then the processing power of the network can be brought to bear more efficiently.

Often, programs are divided in two, a client and a server. The client program will typically be a GUI (Graphical User Interface) front end for a program running on the server, for example, a database server. Many such systems support multiple simultaneous clients. Network client/servers should not be confused with the client/server relationships between objects within a single program. Network client/server relationships are usually API (Application Programming Interface) based communications between programs rather than objects. These connections can be made via RPC (Remote Procedure Calls), sockets, or other commonly available APIs. RPC allows for code on one machine to call a function on another machine. This approach is good for flow of control, but the data sharing capabilities are somewhat limited. Sockets, in contrast, transfer data well, but are limited in program flow control.

The X-Windows system automates the separation of a GUI client from a processing server by automatically sending a bidirectional event stream over the network. This is a limited, but useful, architecture for distributing user interfaces for server programs over the network, but the network bandwidth required is quite high. Still, this level of network automation is deserving of emulation.

Networking Objects

Further division beyond a typical multiple client/single server architecture is also useful in many cases. Unfortunately, distributing programs with current API approaches is tedious for the programmer due to the fact that it is not normally integrated into the development environment or language. The learning curve for programmers to create robust client/server programs is typically quite large.

The current state of the art in distributed object systems are represented by Corba, DSOM, ORB+, ORBIX, PDO and DOE. These object systems are good at the data sharing and flow of control but are highly API based. Switching objects from one system to another is quite difficult due to the dependencies created between the program's objects and the object systems. That is, code specific to the object system must be written to connect and synchronize the objects across the network. Most of these systems also oblige the programmer to climb a steep learning curve.

Some object systems (notably PDO) have reached the point of having individual objects within programs address each other directly via name based dynamic binding. That is an object on machine A can access an attribute, or call a function of another object via dynamic binding by name on machine B. Creating connections directly between objects reduces the impedance mismatch between programming on one machine and programming in a distributed environment. I n other words, when objects within programs communicate directly over the network, no networking APIs need be employed because proxy objects handle the networking aspects without affecting the code within the objects themselves. This is a significant advancement in distributed programming as it frees the programmer from most of the effort of distributing the application over the network. It should be noted, however, that in this case, the client object must be aware of the public interface (API) of the server object and thus dependencies are created just as in client/server relationships between objects in the same program.

SUMMARY OF THE INVENTION

Objectives

It is the express goal of the present invention to provide a method and system for generically providing dynamically reconfigurable links (with transformations) between objects at runtime without requiring those objects to become dependent upon, or have knowledge of each other.

It is also an objective to do this with minimal impact on the implementation of the classes being created. The architecture sought is a server/server architecture between objects, within a single program, between programs and or processes running on the same machine and between programs and or processes running on machines connected over a network.

It is also an objective of the present invention to provide a visual programming environment supporting the specification of dynamic linkages (connections) of objects in languages supporting (or enhanced to support) meta-data, full dynamic binding, probing and generic factory method capabilities.

It is another objective of the present invention to provide these enhancements without modification to the programming language used to create the objects.

It is another objective of the present invention to allow for the links themselves to provide additional programming logic such as the transformation from one data type or scale to another.

It is another objective of the present invention to provide methods for instantiating and destroying these connections between objects during program execution.

It is another objective of the present invention to accomplish this without modifications to the programming environment with which the programmer is familiar any more than is absolutely necessary. However, the design methodology the programmer uses should change considerably through the proper application of the mechanisms provided by the present invention.

It is another objective of the present invention to provide dynamic links with the capability to connect objects that are not running on the same workstation. Furthermore, the mapper that performs the dynamic linkage may be on a third workstation.

Finally, the invention is applied to solving problems in the arena of user interface building. The objective being to use the invention to create application objects that are independent of their user interfaces.

These objectives are met by the following described invention.

Semantics

First, a word about a word. In general, semantics is the study of meaning. In the context of object-oriented programming, the semantics of a class relates to what the class is meant to represent. The meaning of a class is most clearly evidenced through its published interface; the attributes an object maintains and the functions that the object performs.

Ideally, classes model real objects or real systems. Any requirements imposed by a programming system that detracts from the ability to create pure models of real world objects is less semantic as it causes the object to lose sight of its true meaning. For example, if an object represents a dog, it should not have a redraw function because real dogs do not redraw themselves. This is not to say that dog objects function in isolation. Dogs may interact with cats, dog food and balls. Dog objects in computer programs may interact with the user interface system in order to display themselves or with a database system in order to be saved for later use.

Becoming a client to any class for which the real object is not also a client reduces the semantic purity of a class. A dog may have a relationship to an owner, but a dog should not have a relationship to a database within itself Any relationship to a database should be managed externally to the dog object itself Semantic Links A semantic link is a link between two patron objects that is made in such a way that neither object loses any accuracy in its model of the real world due to the addition of the link. The code implementing the patron objects must not be cognizant of the link.

More concretely, a semantic link in the present invention is a system that synchronizes two server objects by creating a generic client between the servers. The server objects are accessed by the generic client through their published interface via dynamic binding. Synchronization occurs when attributes of interest change in the servers, or when one of the patron objects explicitly signals all interested parties. A dog barks, but that doesn't change the dog's attributes. However, it may attract attention if anyone cares about that particular dog's barking.

The main function of the invention is to specify and then instantiate semantic links between objects that have been defined in a dynamic object-oriented language. In the present invention, a dynamic object-oriented language refers to an object-oriented language that supports, or has been enhanced to support, meta-data, dynamic binding and probes. That is, to dynamically link one or more of the members (attributes, functions and properties) of one class to one or more of the members of another class in a language supporting extensible meta-data, full dynamic binding and probes. This includes dynamically binding to and/or probing members of members of attributes recursively.

A semantic link is created through the instantiation of a surrogate object, called a mapper, that uses probing and dynamic binding to attach to both of its patron objects. The mapper is the client and both patron objects are servers to the mapper. Each type of mapper attaches its two patron objects together in a unique way. A resource file contains information for further refining the behavior of each mapper. The mapper may do transformations, such as from a number to a string, scaling from one system to another, such as from meters to feet, or even more complex programming tasks.

Since mapper classes are written using a general purpose programming language (with the stated language requirements), they have nearly infinite potential for variety.

The behavior of link instances are further refined through the use of user configurable properties specific to each type of mapper. Mapper properties allow one mapper class to perform several related functions. For example, all mappers have a property specifying whether the connection is to be synchronized from left to right, right to left, or bi-directionally.

Mappers, and thus semantic links, are generic in form and yet highly flexible in function. The only general requirement for the patron objects in a semantic link (beyond the language requirements discussed) is that at least one member of at least one of the patron objects being connected needs to be capable of having probes set on it. This can be provided by a public attribute, or through the use of a Signal (see Appendix C for information on Signals).

The objects are synchronized (that is a "message" is passed from one object to the other) through the mapper when the attribute changes its value, and the probes are called back. Without probes being called, the link would never synchronize its patron objects. Properties are an exception to this rule, synchronizations from properties occurs only once during initialization of the link.

Because probes cause synchronization, the system is interrupt or demand driven rather than polled. Multiple attributes can be probed, if appropriate, and the mapping may synchronize when any one or all of them change and probes are called. The mapper sets probes on the patron object(s) as part of the semantic link's instantiation. Neither patron object is aware of the nature of the link as it is made external to the object.

In other words, two objects can be attached to each other by a third object without the first two objects becoming clients, thus creating a server/server architecture between the two objects. When both objects are servers, freed from unnecessary dependencies, the opportunity for reuse increases. Dynamic reconfigurations of these enhanced objects can be obtained through programming, scripting or by interpreting resource information. The method described herein incorporates a hybrid approach involving all of these methods.

Most of the requirements of our system are available via the stated language enhancements. The result of this is that the source code for components written in our system is virtually indistinguishable from generic there is a very shallow learning curve for creating dynamically reconfigurable objects.

Examples

As a simple example, suppose it is desirable to have an integer x in class A that always has the same value as the integer y in class B. A semantic link can be created between x and y that will update x whenever y changes and vice-versa. This simple field to field synchronization between two attributes is one of the simplest types of semantic links. Despite its simplicity, it has been found to be quite useful in practice. This link is explored in detail later.

Another type of semantic link ties one or more attributes in one patron object to a function in the other patron object. If a function in the first patron object takes two parameters, then two attributes are selected from the other patron object. Whenever the "trigger" attribute (a property of the mapper chosen by the user) changes, the values are gathered up by the semantic link and are used as parameters to the function of the second object. That is, the function in the second object is called, passing the attributes from the first object as parameters whenever the trigger value in the first object changes.

A more complex semantic link can be made between a public attribute (or signal) and an array of objects. Whenever the probe on the attribute is called, the next object in the array has a function called on it. Since the objects may be physically located on different machines, this mapper can act as a distributor, disseminating processing chores across the network.

In practice, many semantic links are of a general nature, like these, and do not have application specific knowledge in them. This is not a requirement, of course, simply an observation based on current usage of the invention.

A single semantic link involves three objects: The two patron objects being linked, and a third object, the mapper, that does the work involved in setting up, maintaining and ending the semantic link. The mapper is never referenced or visible to the program code of the patron objects. It is built dynamically from a specification stored in the meta-data resource file. Since these semantic links are stored entirely in a resource, and are instantiated dynamically at runtime, the links can be changed without changing the code used to implement the patron classes. There are also helper objects that the mapper calls upon to handle general issues.

Because new types of mappers can be easily created, and they can link together arbitrary sets of class members, the number of possible semantic link types is infinite, however, much can be accomplished with a carefully crafted set of less than one hundred mappers.

Connections

A connection is a named collection of semantic links. All of the semantic links in a given connection link members of the same patron classes. Connections are therefore aggregations of semantic links that coordinate to perform a particular application specific task of object synchronization. Aggregation is no less powerful in the arena of connections than it is in data structures. Connections can also be considered a type of semantic link for purposes of aggregation in other connections.

Connections are instantiated at runtime through an API call "edit". The parameters to edit include at least the name of the connection (unless it is reasonable to infer a default connection name). The edit function uses the name of the connection to retrieve the meta description of the connection, then instantiates the required mapper classes by name using the factory method, and passes the mappers the object instances to be connected as well as the properties the mappers should use to initialize themselves. Once edit has completed connecting the objects, the program flow of control continues. After edit returns, the mappers only activate when a probe is called because an attribute of one of the patron objects changes.

In the preferred embodiment, each connection is created for and belongs to a specific class and can only be used with an instance of that class (or a related class). In a sense, the connection is a meta-"member" of a class. Nevertheless, there may also be some advantages to storing some connections separately from class' meta-data.

Kinds of Connections

While there are potentially thousands of useful types of mappers, there are relatively few kinds of connections. Kinds of connections are not differentiated by the basic technology connecting objects, but rather by what sort of objects are being connected, the user interface used to build the connection, and the details of the "edit" function used to instantiate them. Different kinds of connections solve different general classes of problems.

The most general and flexible kind of connection is an external object connection. External object connections link two different object instances together with a list of semantic links. Each semantic link may tie together different attributes and functions of the two classes involved, but all the semantic links in a named connection tie together the same two patron class types (or sub-attributes of those same two patron objects). External object connections can be aggregated. If one has two classes A and B that have a connection called "A-B," then one can create a connection between class X and Y, X having a field aField of type A and Y having a field bField of type B, then the connection between X and Y could use the "A-B" connection to tie aField to bField. "A-B" could also be used in a connection between A and Y connecting A itself to the bfield of Y. All other connection types are specializations of the external object connection. Additional property information provides problem specific functionality for other types of connections.

Internal object connections are exactly the same as external object mappings, except that both patron objects are the same instance. That is, an internal object connection relates elements together within a single object instance. Internal object connections make more sense when it is remembered that two complex attributes of a single object can be connected together. Remember that public members of public attributes can be opened recursively and linked to each other. That is, a member of ClassA can be connected to member of ClassB (assuming both are used as fields of a third class owning the connection), without affecting the implementation of either ClassA or ClassB. If it is desirable to connect two distinct object instances of the same class type together, an external object connection would be used to do so.

A custom view connection is an example of a connection type that is specific to a particular problem domain, in this case building user interfaces. In the case of a custom view connection, one of the classes being connected subclasses a base interactor class that is a visual component of a user interface system. An interactor can be a widget on a dialog, or a menu item, or some other object from the user interface library. A custom view connection is identical to an external object mapping, except that the list of objects to connect to is limited to the subclasses of the interactor base class and properties can be set for default settings of the view object. What this means is that default settings for the visual object are stored with the mapping.

Custom view connections are eligible to be used in creating a composite view connections. A composite view connection is an aggregator of custom view connections. It adds properties that allow for the specification of the visual appearance of a user interface. A composite view connection connects an application object to a group of visual interactor classes. Each view class is connected to an element of the application class via a previously created custom view connection. The user interface for creating a composite view connection looks and acts like a user interface builder, yet it is simply another interface onto the general connection technology with some additional properties for user interface specification.

One skilled in the art would see that this is not a comprehensive list of kinds of connections, merely a representative list. Other general problem areas can be approached with different kinds of connections. For example, a database connection has properties that allow for the specification of a database with a schema that match the structure of classes in a program. When activities occur in the object, they are connected to the database. When elements in the database change, the object is synchronized accordingly. Similarly, whenever any resources are required, be it hardware, software, or networking resources, a new type of connection can be devised to assemble the resources in a domain specific manner. These connection composers can take on numerous forms with radically different interfaces.

Edit

As with most object-oriented languages, the connection model separates specification from instantiation. Specification is done in an interactive environment described hereafter as the builder. Instantiation is achieved through an API call to a function called "edit". This function is called during program execution to create an instance of the connection between two objects. Each general kind of connection has at least one associated overloaded edit function. The name of the connection is always passed into edit (unless a default connection is appropriate). The other parameters differ for each type of connection. In the preferred embodiment, edit is a member function of a common base class, a global function would also suffice in an alternate implementation.

The edit function reads the meta-information describing the connection and instantiates each semantic link in the connection by planting probes and precomputing dynamic binding on the patron objects as necessary. Any semantic links to properties are synchronized at this time as well. The flow of control of the program returns after edit has instantiated the connection. The connection will never activate until one of the probes on one of the patron objects fires. This passive approach is more efficient than polling.

Note that the structure of the code must be somewhat carefully constructed so as to avoid just the dependencies the invention is trying to avoid. If the first patron object has a pointer to the second patron object as an attribute, and simply passes it into edit with an external object mapping, then the complexity of the dependency has been lessened, but the same basic interdependency between objects in code still exists and modularity of the first patron object has not been enhanced. Fortunately, it is fairly easy for one skilled in the art to write code that calls edit without modifying the code of the objects themselves.

The edit function for external object connections takes the name of the connection, and the patron objects to map to. In the C++ implementation, one of the patron objects is typically the "this" pointer. A non-member version of edit also exists which takes two object pointers and the name of the connection. The edit function for internal object mappings needs only the name of the connection. The static version also takes a pointer to the object. This is the simplest edit function prototype. The edit function for a custom view connection is never called directly by the user, but is rather used internally by composite view connections. The edit function for composite view connections takes the name of the connection, as well as parameters specifying information about the interface being brought up, such as where it will appear, etc. The view classes are always instantiated via the generic factory method, so that they will not appear in the programmer's code. The edit for a database connection takes the database name in addition to the connection name.

Components of the System

The invention consists of a set of cooperative systems. The programmer uses a visual interactive builder program to specify connections between objects whose meta-data is available to the builder. In the preferred embodiment, the classes being linked are also created using the same builder that is used to specify connections between the classes. When the programmer finishes building and connecting classes, he saves the meta-data for the classes, including specifications of connections, to a resource file. During program execution, the resource file is read into memory by "edit" and the links are dynamically established by taking advantage of dynamic binding and probing to attach the live objects together according to the blueprint in the resource file.

The Builder

The main purpose of the interactive builder relating to this invention is to choose the classes that will be mapped to each other and create named connections between them. Because there are different kinds of connections, the interface for creating the mapping can appear radically different. Sometimes it may be apparent that what a user is doing is creating a connection. At other times, it might appear that the user is doing something entirely unrelated, for instance creating a user interface or a database. A good builder will only present the level of detail necessary to do the job at hand for the particular connection type. It is not always necessary, for example, to have control over the mapper's properties. The complexity of using mappers directly can thus be hidden for certain purposes.

The interface for creating a connection is to choose a class as the owner of the connection. Then select the new connection command. When this is done, a dialog is displayed that allows a user to create a list of links between various functions, attributes, properties, sub-functions, sub-properties and sub-attributes of the object. The class can be shown as a hierarchical view of its attributes, properties and functions. When attributes are themselves classes, the hierarchy can be expanded. Also, all elements may have properties, thus an integer field could be expanded to reveal its "minimum value" and "maximum value" properties if those properties are present for a particular integer field. Functions, and the class itself may also have properties. Any set of properties and/or attributes and/or functions can be mapped to any other set providing that a mapper has been built that can map the selected sets of members together. When a set of members is selected on both the left and right sides of the mapping dialog a list of all the connections that can be used to map those two sets together is produced. Each mapper determines itself whether or not it can connect the selected sets through the use of virtual validation functions. Once a particular mapper is chosen, it can be added to the list of links building up the connection. Mappers also have properties that can be edited to refine the behavior of the mapping. These properties are specific to each mapper type, although, properties of derived mappers always include those properties that it inherits from its superclass. Since all mappers share a common base class, they all have at least the base properties.

The Resource File

In the preferred embodiment, the resource file produced by the builder contains a database of meta-data with an entry for each of the programmer defined classes specified in the builder. Connections are stored with one of the classes that is involved in the connection although they could be stored separately in a different implementation. The resource file is a hierarchical attributed data structure known as a table. Tables are capable of storing generic information (similar to a database) in an easily extensible manner. Part of the information stored about a class is a list of all the connections that have been created in the builder to connect that class within itself and to other classes. The information consists of the name of the mapping (each connection for a particular class must have a unique name), the class that this mapping links to and a list of individual links (with properties) that make up the connection. The meta-data for each semantic link stores the attribute, property and function names being connected in the two classes as well as any property information that the mapper requires.

The Runtime Library

The invention supports off-the-shelf compilers without modification to the compiler itself Connections are supported entirely through calls to functions in the runtime library. The runtime library is linked into the executable program. This library contains classes that provide access to routines for instantiating (edit) and destroying (stopEdit) connections between objects. There are also other classes in the runtime library that assist in this. The most prominent family of classes pertaining to this disclosure are the subclasses of EosMapElement. This base class provides the basic functionality of creating a single link between selected sets of two classes. It contains routines for determining membership in the list of appropriate mappers, routines for attaching itself via its stored properties to the classes being mapped, and routines for getting and setting the properties used to determine runtime behavior of the mapping.

The Executable Program

When the libraries are linked with the programmer's code, an executable image results. The program executable consists of the programmer's classes and the resource file (which may be bound to the executable in a resource fork). When the program runs, it loads the resource information file into memory so that the meta-data can be accessed. The connections are stored in the meta-data of the classes being connected. The programmer's classes access the edit function from the runtime library causing the meta-data to be interpreted and the connections are dynamically established during execution of this executable image.

DETAILED DESCRIPTION OF THE INVENTION

Introduction

The present invention will now be described more fully with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete and will fully convey the scope of the invention to those skilled in the art.

The invention is implemented on a general purpose computer, commonly referred to as a Personal Computer (PC) or Workstation. Some aspects of the invention require that the computer be connected to a network.

This portion of the disclosure will first describe the structure and management of connections after they have been instantiated and connected, then the instantiation of the connections from descriptor data, and finally a method for specification of those connections interactively within a builder program.

Appended herewith as Appendices are exemplary implementations of elements of the present invention. Those skilled in the art will appreciate alternative implementations also suitable for implementation of the present invention.

A simple semantic link

Figure 1:
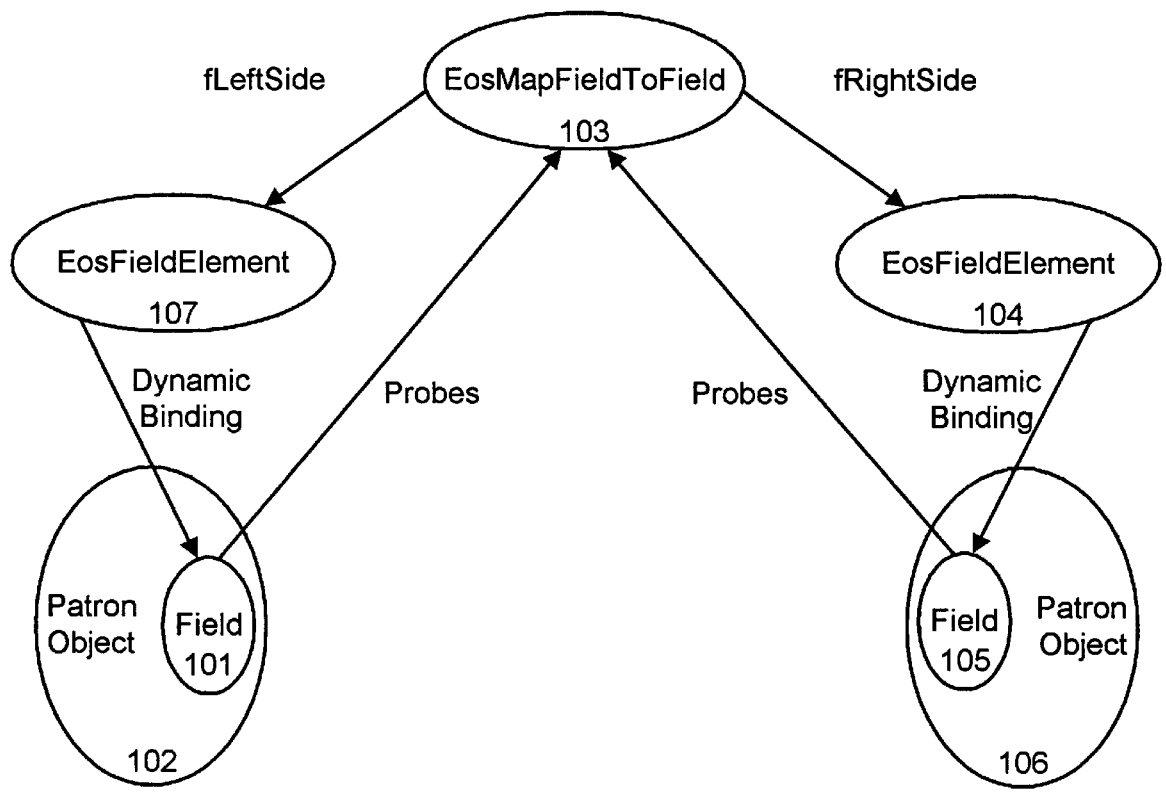
FIG. 1 is a detailed diagram of a simple field to field semantic link.

FIG. 1 shows the objects involved in a connection with a single semantic link between two objects. Assume the connection has already been created via a mechanism such as that described later, and this is the resulting configuration of objects. The EosMapFieldToField object (103) has previously set a probe on a field (101),(105) of each of the Patron Objects. Changing one of these fields initiates a synchronization through the mapper. The following steps occur when the left field (101) is changed:

1. When the left hand side's field (101) is changed, all of its probe callbacks are called.
2. The EosMapElement::leftHandSideCallback, a member of EosMapFieldToField (103) is called (this is the raw probe callback). Note that in an alternative embodiment this callback could be in the EosFieldElement (107).
3. A flag is set indicating that the mapper is active. (The flag is cleared after leftHandSideChanged returns)
4. The leftHandSideCallback then calls a virtual function of the mapper class called leftHandSideChanged.
5. The base class implementation of leftHandSideChanged calls a virtual function of the mapper called valueChanged. Most mappers override valueChanged rather than leftHandSideChanged in order to do transformations without regards to direction. The parameters are: The field that is changing, the type element that is changing (in this case the left side (107)), and the type element for the other side (104). The type element may represent a field, function, property or a list of members.

void EosMapElement::valueChanged(EosProbeObject *src, EosTypeElement *srcEl,EosTypeElement *destEl);

In the simple case of the field to field mapper, valueChanged simply gets the value from the source side parameter (that changed) and sets the value on the destination side to this new value through the right type element (104).

6. The right type element (104) sets the field (105) in the right hand object (106) through the dynamic binding mechanism. The type element has already precomputed the index of the field from the field name, so that this is as efficient as possible.
7. Probes now fire on the right hand field (105), which causes rightHandSideCallback of the mapper to be called. (Again, in an alternative embodiment this could be in the field element (104) rather than directly in the mapper) This callback again checks to see if the mapper active flag is set, and since it is, processing stops; that is, the value is not forwarded to the left hand field (101). This check helps to avoid infinite looping within the mapping machinery. (The probes mechanism also has circular reduction machinery, but adding it to the mappers is more efficient and safer.) Of course this behavior can be overridden in cases where it makes sense to do so.

The probes must be allowed to fire on the field (105) because other objects may have planted probes on this value and they would not be synchronized if the probe did not fire. If the right hand field (105) changes first, then the rightHandSideCallback would have forwarded the information to valueChanged, however the parameters would have been reversed to reflect the change in the direction.

The exact details of the implementation of valueChanged, leftHandSideChanged and rightHandSideChanged may of course change for each mapper subclass. The general mechanism is flexible enough to handle most of the interesting cases. In this simple case, the mapper simply passed along the value, unchanged, from the left hand patron object to the right hand patron object. It should be noted, however, that the mapper could do anything with the value. It could convert it from metric units to English units, it could use the number as an index into a database and pass a field from record N on to the second patron object. Anything that can be done in a robust programming language can be done inside of the mapper. If a mapper is bi-directional, however, the transformation should always be transitive. That is, the transformation should be reversible. Otherwise, the circular reduction mechanism can produce spurious results in some cases.

Much of the generality obtained comes from the API of the base class EosMapElement for the mappers, it also comes from the type elements that represent the member or members involved with each side of the semantic link. As shown in FIG. 1, there is a single type element for each object being connected to. If multiple members are mapped to, the type element holds a list of other type elements.

Network Considerations

Figure 2:
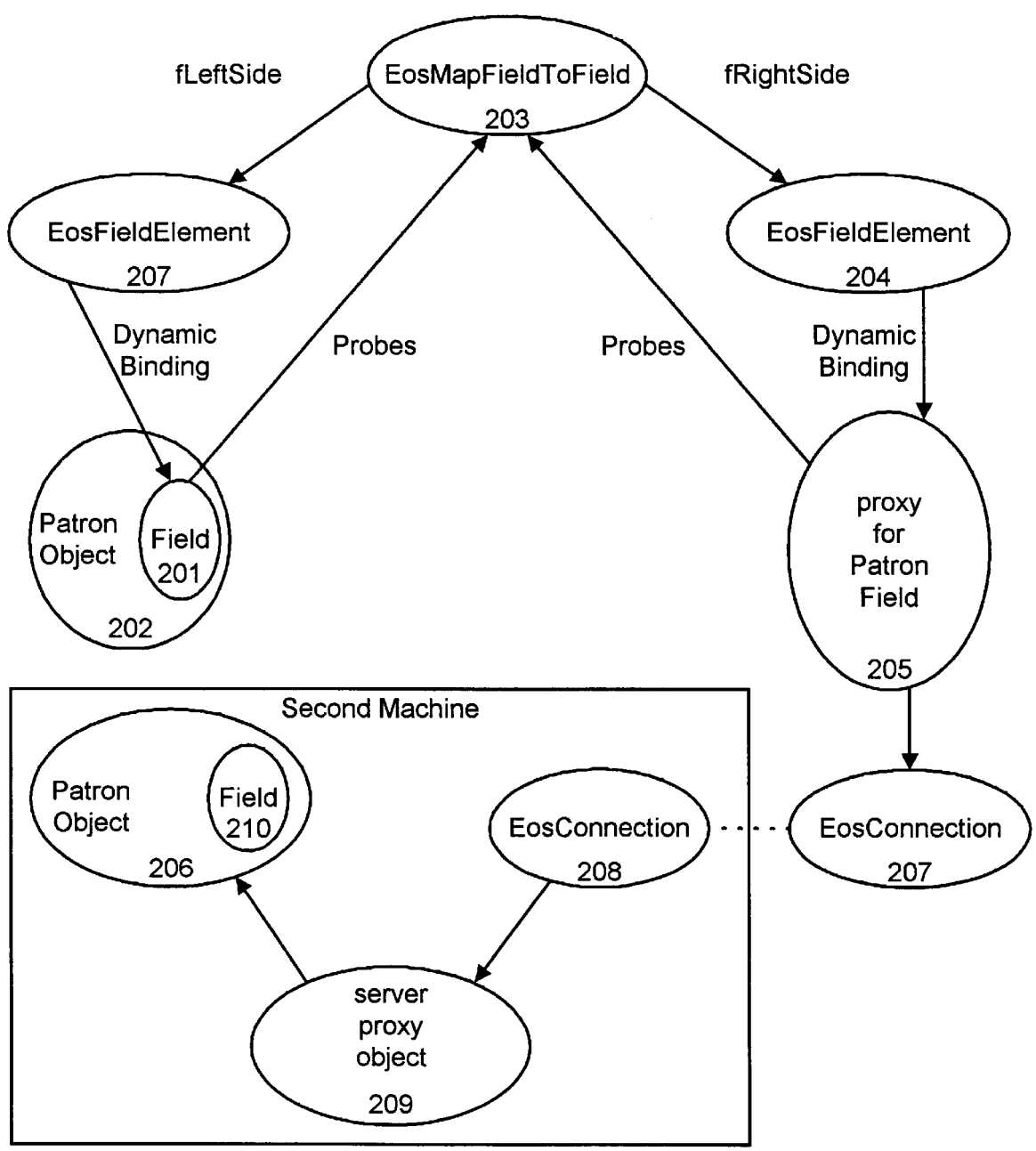
FIG. 2 shows the same simple semantic link as FIG. 1 with one patron object on a separate machine connected over a network

FIG. 2 shows the same semantic link as FIG. 1 with the right hand patron object (206) on a second machine.

Note that either or both fields in the patron objects in FIG. 1 (101) or (105) could be replaced by a network proxy object. When the patron object (106) is actually a network proxy object (206) the details change slightly. Essentially, the proxy object pretends to be the object that it represents. A generic proxy such as this cannot handle normal non-dynamic language syntax, such as invoking a function directly off of the object, but what it can do is provide the services of probing and dynamic binding as if it were the patron object. This is because dynamic binding and probing are the same for all classes in the language.

The type element sets the data on the proxy object in the normal way through dynamic binding, but the proxy object takes care of packaging and sending the message to the real object over the network. In the preferred embodiment, the network protocols were implemented using a commonly available RPC based networking library, they have an identifier for the object to send the message to, the data that changed and the path to the field of the element to set. Dynamic binding is able to get and set fields by index, or invoke functions by index, so the proxy object must be able to deal with these three forms of information as it builds up the RPC call to the other side of the network. Different mappers generate these different types of information, so they are all put into a canonical form. The details of the RPC implementation are beyond the scope of this disclosure, but are commonly available.

EosProxy

The proxy object is constructed with a connection object, the object to point to the root object involved in the connection, a path to get to the subfield (described below), and the name of the field that it represents.
EosProxyProbeObject(EosConnection *connection, EosObject *object,const EosObjectPath &path,const EosAtom &name);

As each proxy is set up, a unique identifier is generated for the object instance on both sides of the network. The id on each machine may be different, so the id is passed to the other machine during set up, so that the object will be accessible later. Both machines have a lookup table that is used to transform the ID into the actual pointer in the address space of that machine. The proxy object also must reset itself whenever elements in the subclass path change. An exemplary implementation of the proxy object is given in Appendix I. Note that there is a probe object client and a probe object server. The only difference is that the client initializes the link. After instantiation, a bi-directional communication link is established. The client will use RPC to call the setupServer function of the server, passing in the client ID number, which will then call the client back passing the server ID number back. The details of initially distributing the objects over the network are beyond the scope of this disclosure.

EosConnection

The EosConnection class is a simple wrapper around the RPC calls used in the network connection. Each EosProxy has a pointer to a connection, however, if there are several proxy objects communicating with objects on the same machine, then there need be only one EosConnection instance to service them all. The connection (as can be seen in Appendix I) has several types of messages that it can pass along. It uses the object ids previously mentioned to get the right message to the right instances. It uses a slightly different protocol to fire probes than to change data. One difference is that if a probe is in the process of firing, the connection will see to it that secondary probe firings do not go back to the mapper than began the exchange (just as the mapper itself does to reduce infinite loops). In this case, it reduces the network traffic by a third if the mapper object is on a third machine.

Path Objects

Path objects are part of the type elements that connect via dynamic binding to objects. One of the important features of the invention is that sub-members of sub-members of sub-members of the patron objects can be connected to as far down as needed. The path object contains the information to traverse the object to get to the member of interest. In the case of multiple member mappings, each member has its own path and can be from different sub-members. The path object takes care of the maintenance of this path to get to the actual member. This is vital so that the mapper can access the actual field to plant the probe on it or to dynamically bind to it. It is also used by the type element to find the object containing the member (the parent object) so that it can use the dynamic binding mechanism to set the field's value by index. (This is necessary because dynamic binding to members is implemented as an indexed member relative to the object containing the member.) Of course this also applies to functions, but functions do not have sub-members unless the function has properties, so a function would usually be a leaf node of the path. Note that for properties, the parent object is the object containing the member with the property. Properties are also leaf nodes of the path although theoretically a property could have sub-properties. Primitive fields, such as integers, do not have sub-members (other than properties) either. Therefore, sub-members only exist for fields that are themselves classes.

A special case exists for the root object itself That is, if a semantic connection is created to the object that owns the mapping, rather than a member or sub-member of that object, then the path is empty. In this case, there is no parent object, and the type element simply connects that semantic link to the object itself.

The path object also solves some really difficult situations related to the dynamic nature of objects in a running program. If, for example, a semantic link were made to a field inside of a pointer field, and the pointer field is reassigned to point to a new object, then the mapper has to disconnect its probes to the first object, and reconnect to the new object. The attachments to subfields of subfields is kept track of by keeping a path of field names, for example, fieldA.fieldB.fieldC would mean that fieldC is a member of fieldB, which is a member of fieldA. The path object plants probes on each of these intermediate levels and when an intermediate level changes, it calls the mapper's functions to reset their probes. Mappers must be able to detach from the old object and reattach themselves to the new objects as they change at runtime, but the path object does all the complex bookkeeping. The raw probe machinery is only aware of individual instances to probe, and does not have the contextual ability to detach and reattach as necessary like the mapper's and paths do. If probes are planted by hand, this functionality may not be obtained automatically. Dynamic binding and meta-data are used to find the new item to plant probes on.

If the value of an intermediate pointer field in the path is set to NULL, then probes are removed from the old object, but not reconnected because there no longer is an object to connect to. Also, any probes set on path members further down the path would be removed. Similarly, if a NULL pointer is assigned a valid object pointer, probes would not be removed, but simply added. Probes would be planted by the mapper on the objects, and by the path object on any further intermediate path elements.

Similarly, if one of the objects involved in a connection is deleted for some reason, the connection is shutdown automatically. The path object can be helpful in determining this occurrence.

Reference Counted Pointers

Greatly simplifying the implementation of all of this is the fact that in the preferred embodiment all pointers in the system are reference counted pointers, that is, you cannot directly delete an item that might be pointed to by someone else, you can only remove your reference to it and allow it to decrement its reference count. If the reference count goes to zero, it destroys itself In the example of changing the path, if you set the pointer to NULL, then if that were the last reference to the other object, it would be deleted. However, the path object tells the mapper to remove probes on the object as part of reassigning the pointer. The path object then is very important in managing the removal of probes prior to deletion. If this is not done in the right order, then you might reference memory that had already been freed, so the combination of the reference counted pointers and the path object is fundamental to fully addressing all of the issues involved. The path also keeps a reference to the object so that it is not prematurely destroyed. Reference counted pointers are an implementation of a technique called garbage collection.

Type Elements

One of the design goals of the system is to make building a new mapper class as easy as possible. Requiring simple mappers deal directly with issues of meta-data and dynamic binding overly complicates their implementation. Type elements are introduced to make access to the patron objects (from the point of view of the mapper) as generic as possible. Each mapper class has two type elements; one for the left side and one for the right side. Of course, the names left and right have no particular meaning to the computer, and are just for human consumption (although there is a correlation to the user interface described later). One major function of the type elements is to have a standard interface that makes functions, properties and lists of members look as much like fields as possible. Having all of these language elements look as similar as possible to the mapper means that mappers do not have to have special purpose code to handle common general cases.

Figure 3:
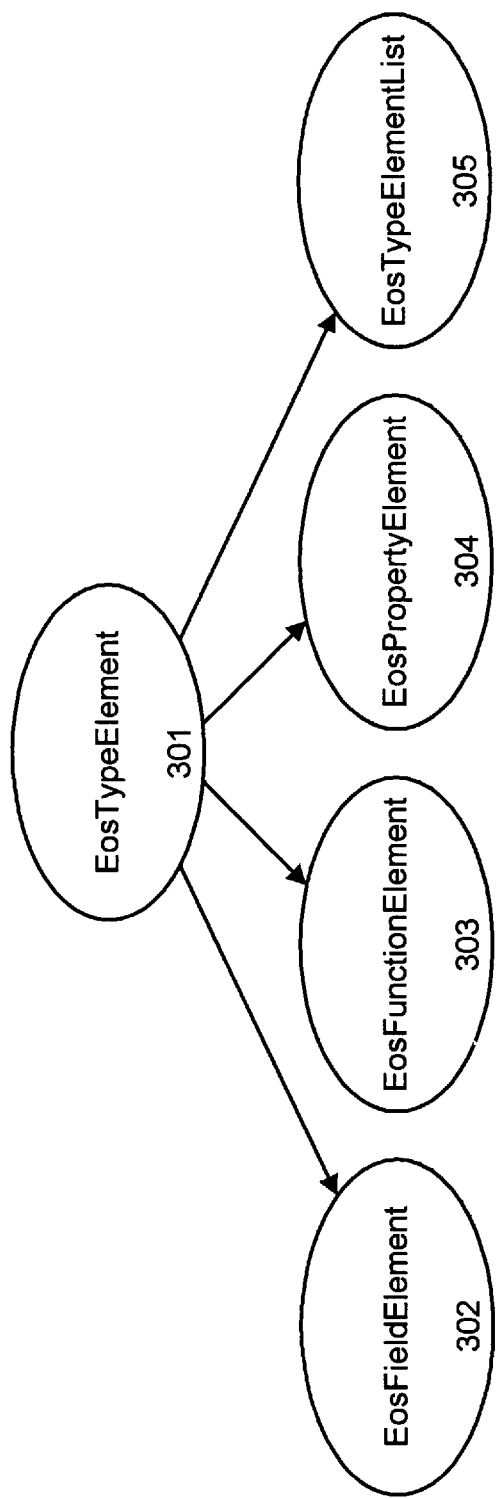
FIG. 3 shows the class hierarchy for the type elements

FIG. 3 shows the hierarchy of type elements.

EosTypeElement

EosTypeElement (301) is the base class for all other type elements. It provides a common base level API for the other type element subclasses. It strives to provide similar services for all the other types, but it most closely resembles a field. Specifically, it tries to make functions and properties act like fields in as many cases as it makes sense to do so. For example, all type elements except for the list element have a function to set data and a function to get data. EosTypeElements (as well as the mappers) should be programmed in a language with the same language requirements (probes, meta-data, dynamic binding and generic factory methods) as the patron objects so they can be created by name, etc. In fact the type elements and the mappers must be in the same executable program, so it is most convenient if they are in the same language.

Most of the functionality of all of the type elements is accessed through the interface to EosTypeElement. That is, the functionality is exposed in virtual functions of the subclasses that is accessed, is for the most part, accessed through the common API of EosTypeElement. This makes each type work in a similar fashion when it makes sense to do so.

Dynamic binding is done at the class level, not the field level, so it is important for each type element to be aware of the object instance that holds the member, in addition to the member itself The parent pointer accomplishes this task by pointing to the object that contains the member of interest to the type element. Again, this is a reference counted pointer, meaning that the type elements must be freed before the parent object can be freed. The type element gets this from the path object (which is a member of the type element.)

Type elements also have properties, but these properties are simply used to store the type element's state. The user is never exposed to these properties, so it is only used as a persistence mechanism. No additional functionality would be gained by exposing these properties to the user and it would make the system more difficult to understand. The mapper sets and gets properties on the type elements it owns as necessary. The most important type element property is related to the direction that information can flow.

Type elements can also report which kind of type element they are.

EosFieldElement

EosFieldElement is used when the language element being mapped to is a data field member (an attribute) of the patron object.

The interface to EosFieldElement (302) is virtually identical to that of EosTypeElement, the base class. Field elements (and other element types) interact with mappers to determine the direction in which information may flow. For most real fields, information can flow both to and from the field. The mapper may decide to only transfer informaiton in one direction, but it is not a limitation of the field. The need for this should become clear as how the various type element subclasses emulate field behavior is discussed. It is sufficient to say that a mapping may have information flow in either or both directions.

EosFunctionElement

EosFunctionElement is used when the language element being mapped to is a member function of the patron object. This element has additional abilities to access the function parameter list meta-data information. Functions following these forms:

void func(Type);
    Type func(void);

are treated as fields of class Type. Type can be modified by const, &, *, ect. without loss of the general form. This abstraction is provided by the EosFunctionElement which overrides the getting and setting of data to mean call the function to get or set the data, and the data is passed. The functions determining the direction of reading and writing of the type element are of importance so that one do not write a value to a function that returns a value, or read from a function that takes a parameter. In other words, the function returning type is treated as a read-only field of type and a function taking a parameter is treated as a field that can only be written to. This special case makes it possible for mappers written to tie fields together to tie functions to fields (or other functions) without each mapper requiring special case code. This is accomplished through the virtual functions access, which determines direction, and getRealProbeObject which returns the value and setProbeObjectValue that sets the value. Of course depending upon the access, the get or set function might not be valid to call and the mapper should not call it.

In the many cases where the function does not match the forms above, the function element provides additional API interfaces for the mapper to tie into to access and build function parameter lists. In order for a mapper to interface with the more general functional interface, it must know that it is dealing with a function and act accordingly. Although this may not be used as often, accessing the full functional interface is more flexible and powerful.

Get/Set function Pairs

Get/set functions are functions with special properties that relate them to each other. There are three entities involved in a get set function pair. The get function, a function of the form:

Type getFunc(void);

a set function of the form:

void setFunc(Type);

and a probe enabled field (possibly a signal) that interested third parties use to know when to call the get function. Together, with the help of the EosFunctionElement, these three entities function as a computed field. The get function has the name of the probe enabled field as a property and the set function has the name of the get function as a property. The set function is optional, and in this case the get/probe combination acts as a read-only field of the object.

Since the EosFunctionElement subclasses EosTypeElement, mappers can connect to function elements without knowledge that it is a function (rather than a field) that they are attaching to. Since the base class mapper knows about the direction that the mapping can occur, the type element must give feedback to the mapper as to its ability to be a source or destination for information. When the EosFunctionElement is dealing with a get/set function pair, then it will function exactly as a field with bi-directional information flow.

In order for get functions to participate in looking like a field, they must have an associated probe field. If there is a get function and a signal (without a set function) then it will be a source of inforation only.

EosPropertyElement

EosPropertyElement is used when mapping to properties of classes, fields or functions.

Similarly, EosPropertyElements are treated as fields so that the value can be mapped from the property to other language elements by mappers that are only aware of dealing with fields. In other words, the EosMapFieldToField mapper can map a property to an integer in another patron object even though the mapper is not aware of properties.

Each class of type element can also identify itself as to its type through a virtual function in case the mapper needs to know. Properties do not have probes, therefore, they are only queried during initialization. In the preferred embodiment, properties do not change at runtime. If a change at runtime is required, a field adequately fulfills this role. Also, since property information is class wide, rather than instance based, allowing mappers to change the property value at runtime may lead to undesirable side effects. Static fields can fulfill the role of class based data when required. Properties are then used as source information for initializing fields (or calling functions) of objects that are mapped to.

As an example, suppose that an integer value is mapped to a scroll bar object in a GUI system. The scroll bar has a minimum value, a maximum value and a current value. In this case, one would map the minimum property of the int to the minimum value of the scroll bar, the maximum property to the maximum value and the integer itself to the current value of the scroll bar. Since the properties are sources only, the direction of the initialization is implied to be from the property to the scroll bar. However, the direction of initialization for the integer is not implied as it could (and does) flow both ways. It is important in this case for the integer to initialize the scroll bar and not vice versa as the scroll bar object has no idea as to the semantics of the application. Thus there is an additional property on the base mapper object that determines the initial direction of initialization for just such cases.

EosTypeElementList

EosTypeElementList is used when mapping to more than one member. It contains additional functionality to handle lists of other type elements, it contains an array of the elements themselves, as well as functions to access the elements via an index mechanism. Due to the way mappers are specified (with validation), a mapper that doesn't know how to deal with multiple type elements will never have an EosTypeElementList to deal with at runtime, so special case code to deal with this is not necessary for most simple mappers. In the preferred embodiment of the mapper class, there are separate virtual functions for dealing with lists of members vs. single members. This greatly simplifies the implementation of mapper classes that tie single members together. For those mappers that need to tie multiple members, there are functions for accessing all of the elements required to bind dynamically and/or probe the appropriate fields.

These types of mappers are more specialized than the simple mappers that map a single field to a single field, so it is appropriate for them to be required to have more knowledge.

Type Elements

The type elements extend the number of cases simple mappers can be applied to without further complicating the implementation of the mapper class. If the mapper maps a field to a field, then with type elements it may also be used to map a property to a function taking a single parameter. This generalization increases the employment of mappers without complicating their implementation.

EosMapElement

EosMapElement is the base class for all mapper classes. Appendix E is the header file for an exemplary C++ implementation of EosMapElement, and Appendix H contains an exemplary header file for EosTypeElement. The base mapper has two important properties. The first is the fMapType field which determines whether synchronization is to occur left to right, right to left or bi-directionally. The second is a property indicating the flow of information in the case of initialization. The mapper has a left and right Type element involved with the link. It has the flag to reduce loops. The function typeElementChanged is called when the path has changed and the mapper needs to reset its probes. Each mapper class can override getProperties and setProperties in order to add additional properties specific to their behavior. The mapper classes must also call their superclass properties to get the base properties included as well. Mappers also have functions such as validate, access and getPrintName that are only used in the builder.

Setting up a Connection From a Script

Semantic links can create any type of relationship that the mapper class, in combination with type elements, and path elements can implement. In order to perform its services, however, the objects making up the semantic link must be instantiated, initialized and set up to refer to the patron objects. While it would be possible to set up these links programmatically each time one was required, this approach is error prone and tedious.

One solution is to have an interpreted script that describes the connections and their individual semantic links so that the script can be read in at runtime and the connections formed without having to code anything beyond instantiation of the patron objects, and a call to read the script.

Any number of scripting languages could be devised to describe the connections. They could be specified in an easily human readable format, but this might be more difficult to produce automatically as shown later. In the preferred embodiment, the connections can be completely specified as data structures. That is, the scripting language chosen need only provide data, not programming instructions such as loops, if statements, etc. It could even be stored in a typical object-oriented or relational database. In fact, even a persistance model would be sufficient if parts of the model could be instantiated individually.

The invention as disclosed uses a hierarchical attributed data structure known as a table to store the meta-data that describes the classes and the connections between the classes. The data structure used is not as important as what is stored in it. Much can be learned about what data is required from the examples in Appendices F and G which contain the meta data for two relatively simple connections.

The edit function interprets the information in the table to first find the class for which the connection is stored, then find the named connection by looking it up in the table of connections in each class, then reading the specification for the connection out of the table and creating and initializing the proper data structures to set up the individual semantic links as described in the previously shown link.

If an external object mapping is created to a NULL patron object, then the second patron object is also dynamically constructed via the generic factory method.

Setting up a Connection from a Descriptor

The job of setting up the connection from a description of the connection is the job of the edit function.

The edit function for an external object mapping is typically invoked programmatically, usually by the primary patron object (that stores the meta-data). In the preferred embodiment, edit is an inherited function from a base class. In C++, the call to edit would appear as:

myobj.edit("connectionName",connectedObj);

With this call to edit the following will happen:

1. The meta-data information for the object that the edit function is being invoked on is retrieved from the resource table using the name of the class. This takes advantage of the object's ability to be "self describing" at runtime.
2. A new instance of EosObjectViewMapper is created. This object is responsible for orchestrating the reading and interpreting of the meta-data and constructing each of the individual semantic links.
3. If the right hand patron object passed in was NULL. Then this object is created by name throught the generic factory method.
4. The table containing the connection descriptor (in this case "connectionName") is obtained from the meta-data database and is set on the new instance of EosObjectViewMapper. If the connection descriptor is not available in the meta-data for the class edit was invoked upon, then that class' superclass meta-data is retrieved and the descriptor is sought out there. This happens recursively until the base class is reached or the named connection is found. This is an important operation as it gives connections the same behavior as virtual functions. When the connections are composite view connections, this enables a unique technology known as "virtual views" where which view is used will change depending upon the type of the application class instance mapped to the view. If either the call to get the meta-data or to get the connection descriptor from the meta-data return invalid conditions the edit fails and NULL is returned.
5. The object view mapper object now traverses the table containing the connection descriptor. There is an entry for each semantic link. For each semantic link description, the individual mappers are created by name through the generic factory method and initialized using property information stored in the table for each semantic link. This includes the creation and initialization of the EosTypeElement members (fLeftSide and fRightSide) and their respective path objects. These like the mappers are created by type name according to the information stored in the descriptor information. The setProperties call allows the individual mappers associated with this connection to get the appropriate property information to perform the connection as it was set up in the builder. For all mappers there is at least:
   A. Direction information which defines which side will be updated when a probe fires.
   B. Initialization information that defines which side will be the initial value.
   C. Property information initializing the left and right side EosTypeElements.
   D. Type information for the mapper. (this will determine which EosMapElement instance subclass will be constructed.)
   E. Optional properties for the specific mapper class.

For all type elements:
   A. Type information (this determines what kind of type of element is constructed).
   B. Member Name (defines name of attribute, property or method this element represents) including the path to the member.
   C. Member type information(type of member ex. int, float, EosString). This information is mainly used for validation.
   D. The type of the member's parent.
6. Now that the mapper objects are instantiated and initialized, all of the mapper objects in the connection are instructed by the object view mapper to plant probes on the appropriate members of the patron objects. In this process the two top level objects are passed to a function on the EosObjectViewMapper called insertProbes. This method will call two functions on each mapper called insertRightHandSide and insertLeftHandSide. These functions set probes on the objects of concern defined by the individual mappers or the respective type elements associated with them. In the process of inserting probes the mapper will set up each of its type element members with regard to the objects that they represent. Each type element resolves the parent object at this point and precomputes a function or field index to the member of interest. To get the object that needs to be probed the mapper will call EosTypeElement::getProbeObject. This function will return the object that the mapper will set a probe on using the path to find it. In the case of fields the object returned will be the field that is referred to by its name field. In the case of methods the associated probed field will be returned. If the method or attribute is not a source of information, only a destination, then probes won't be set for it.

Using the direction attribute that was stored in the mapper's properties, the code determines which side(s) need probes. If both directions are allowed then probes are set on both patron objects. If only the right or left side is allowed to be monitored then only the specific side will be probed.

7. Each mapper now passes the appropriate property table to both of its type elements.

8. Object initialization occurs. In this process the mapper is initially synchronized. This has the same effect as if the probes have fired. This is controlled by the definition stored in the table. There are four possibilities (listed below). Each of these possibilities has a numeric value at runtime but are presented to the user in a human readable form. Initialization applies to all children defined in the EosObjectViewMapper's list of valid mappings.

No Initialization—no synchronization at startup (useful if the connection is only valid when the object value explicitly changes)

Left Initializes—left side initially updates the right side (useful if presenting a data value stored initially in an application object that needs to set a view widgets initial condition)

Right Initializes—right side initially synchronizes towards the left side.

Both Initialize—first right side initializes then left initializes. (useful if one sides initial value is considered invalid in the opposite sides context but the inverse is not true.)

Other Versions of Edit

Each major kind of connection has its own version of edit. These versions vary slightly from this one. The internal object mapping simply calls this one passing the same object in for the left and right sides. The custom view connection is also very similar, except that the right hand side is always an interactor subclass and it is almost always NULL. Also, there are additional properties used to initialize the view class. The composite view connection differs the most from these versions. Since the edit function for composite views always brings up a window, most of the differences involve setting up the window, and controlling its behavior, position, and geometry. This version of edit returns a pointer to the window, while the other versions return the object view mapper. Other kinds of connections might return database pointers, or other information pertinant to the connection.

StopEdit

Creating dynamic connections through the edit process creates links between objects, creating emergent behavior without compromising the independence of the objects involved. However, being able to create connections is made more useful if the connections can also be broken when they need to be. The stopEdit function will remove probes and release the mapper objects that make up the connection. The call to edit will return a pointer to the newly constructed connection (instance of EosObjectViewMapper). When the object connection is no longer needed this pointer can be deleted. This will cause the connection to call removeProbes on all mappings that are contained in its connection list. Each mapper will be called to remove the probes that it set. This process again relies on the two functions canMapLeft and canMapRight to remove the probes.

Also, if either of the objects being linked is destroyed, then the link will be brought down safely as the objects are deleted.

Specifying Descriptors Interactively

Writing scripts to tie objects together by hand is an improvement over writing code to instantiate objects to create connections. However, since the scripts described are simply data structures filled with the information specifying the connections, it is a fairly simple process to create a program that allows a user to interactively specify this information.

The builder is an interactive GUI program that the programmer uses to specify the declarations of named connections between classes. In the preferred embodiment, this program is also a class browser used to create the classes themselves. While the combination of these functions is not strictly required, it does make the program much easier to use. The interface chosen to edit this information is a simple one. Improvements could almost certainly be made. For some, perhaps a more highly graphical interface with nodes and arcs would be more intuitive, but the interface disclosed is very direct.

User View of creating connections in the Builder

The specification of the links is really quite easy from the user's point of view. It consists of the following steps:

(1) Select the primary class to which the connection will belong. This class will be the primary patron object involved in the connection and will also be the class in which the meta-data describing the connection will be stored.

(2) Select the command to create a new connection for the selected class. This will pop up an information collection dialog.

(3) Type in the name of the connection (which will be used later as the parameter to edit to instantiate the connection)

(4) Select the type of the connection. The preferred embodiment has four types of connections:
External Object Connections
Internal Object Connections
Custom View Connections
Composite Views Depending upon the type of connection selected, the interface for creating the connection can be quite different. The interface for external object connections is the most exemplary interface as it most closely reflects the underlying data structures. The interfaces for Internal object connections and custom view connections are nearly identical to that for external object connections. That for composite views is quite different, and will be briefly described.

External Object Connections

If the user chooses to create an external object connection, then he must specify the other type of object to connect to. This simple task is accomplished by choosing the type from a list of all the types in the system. This is presented in a list for selection so that a class that doesn't exist can't be typed in. Note that the same type can be chosen on both sides, but this is still different than an internal object mapping, as it would connect two instances, rather than internally connecting one.

Figure 4:
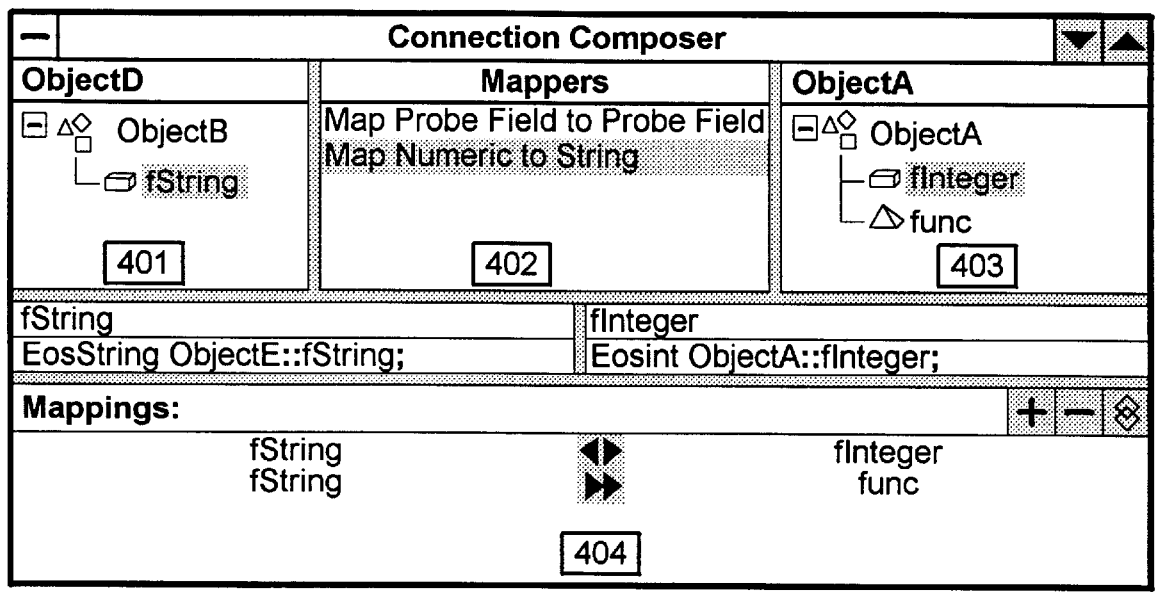
FIG. 4 shows the interface to the preferred embodiment for specifying a connection.

The user is now presented with a dialog as in FIG. 4. This consists of 4 panes. The bottom pane (404) shows the list of semantic links that make up this connection. Building this list is the purpose of the dialog. The top left pane (401) shows a hierarchical tree view of the first patron class. It clearly distinguishes between functions, primitive attributes and attributes that are classes through the use of bitmaps representing each type. The data members in the tree are expandable to show their functions and attributes recursively. The right pane (403) shows the second patron class. The user's task is to select one or more members from each patron class.

In the preferred embodiment, mappers may only attach to private members in the context of an internal object mapping for the object itself Members that are protected may be used in the context of an internal object mapping in a derived class. Only public members may be accessed by mappers in external object mappings. There are exceptions, for example, the triggers for the multi-parameter function do not have to be public because they are accessed through the properties of the associated get function. The current implementation does not enforce limited access to private and protected members, and allows all members to be mapped, however, it is intended to be reimplemented in the preferred method.

Each time the user selects or deselects a member of either patron class, the middle list (402) is rebuilt. It consists of all the mapper types that are able to link the selected sets of members to each other. Not all mappers know how to link arbitrary elements together. For example, if a multiple parameter function were chosen, a field to field mapper would not be appropriate. A mapper may require that a string be selected in one class, and an int in the other. It may be as specific or general as the mapper requires. Note that the list of available mappers may be viewed as a simple list of strings, or as a hierarchically organized tree, or in some other manner. When many application specific mappers are added to the system, it is helpful to organize them more than is possible with a simple linear string list. For example, when building a composite view connection, a pallette of bitmaps is presented to the user to give him an idea of what the interface element looks like. The bitmap is a property of the custom view connection.

Once a mapper type appears in the middle pane, the user may select it. Once selected, it can be added to the list of semantic links for this connection. As it is added, a dialog will pop up that allows the user to set the properties for that particular mapper when used in this context. (Interestingly enough, virtual views are used to create a different view for each mapper type.) Each mapper type will have its own unique dialog to display its properties. Once the user initializes the properties, the mapper is added to the list at the bottom. (Properties may of course be edited later by selecting the row representing the semantic link.)

The user may add as many semantic links to the connection list as required to build up a complex connection. Individual semantic links may also be easily deleted.

The entire connection declaration dialog may also be closed and reedited at will. The connection itself can also be deleted if it is no longer required.

From the user's point of view, declaring a connection is simply a matter of point and shoot. Of course, he must know what each individual mapper does, and he must know how the properties for that mapper operate. Due to the fact that new mapper classes can be so easily constructed, the only real solution is to have on-line help available for each mapper class including documentation for each property.

Composite View Connections

The interface for creating composite view connections is much different than for the other kinds of connections disclosed. In this type of connection, the user's primary purpose is to build a user interface that has elements tied to language elements of his application objects. To create a composite view connection, he chooses to create a new connection, then chooses to create a composite view connection. After this, he types in a name for the connection, then chooses whether to create a window or a menu connection. If a window connection is chosen, a default view is created. Then the user selects either a field or function in the business object to which to connect the view object to. Depending upon the type of the field or function selected, a list of components (actually custom view connections) is built that the user can choose from. When a view is chosen, he chooses where to put it on the dialog being built, and may set visual properties on it (these properties are saved in the extensible meta-data format). The user has no direct access to the mapper properties at this point, but he may create a new custom view connection to do that.

Implementation Details of Mapper Specification

Creating a builder for the specification of connections involves an exercise in the production of a graphical user interface. As this is a common requirement of modern programs and one skilled in the art should be familiar with the requirements of GUI programming, therefore, the details of the GUI implementation will be excluded from the disclosure. There are of course architectural considerations related to the mappers that are extremely relevant. These are fully disclosed.

Basic Information Collection

The dialog described in step 2 above is a simple information gathering dialog. The information collected includes 1) The name to be given this collection of semantic links, that will later be used to look it up to instantiate the connection. 2) Whether this is an internal or external object mapping (or some other type of mapping). In the case of an internal object mapping, the only additional information required is the name of the class that the mapping is for. This is gathered from the context that the dialog was presented within. The primary class involved in the mapping must be selected before the mapping can be added to it. The primary class is the class that has the connection's meta-data stored within it. It would also be possible, of course, to simply enter this class type into a field of a dialog and free the interface from this contextual consideration.

In the case of an external object mapping, the user is presented with a choice of all the other classes in the system that he may wish to connect to. The other class type is required to create the connection so one of them must be selected. The second type is explicitly selected by the user. If the user selects the primary type again, then it implies that two instances of the same object will be connected at runtime. Internal object connections tie together elements of a single instance of the object, rather than tying together two instances.

An internal object mapping can be thought of as a special case of an external object mapping where the other object is the same instance (and of course the same type as) the first object being connected.

Other connection types of connections are of course possible. In the preferred embodiment, composed user interfaces such as menus and dialogs, as well as custom connections to widgets, such as scroll bars, etc. are also selectable as connection types. These types of connections have more meta-data properties that describe the look and feel of the interface, but the basic connection of objects is exactly the same. Its just that in this special case, one side of the object connection is always a user interface class.

All of this information is stored in the meta-data by the code that brings up the dialog. The exact format of the meta-data is not as important as the information contained therein.

Specification of the Semantic Links

Using the information collected from the preliminary new connection dialog, the dialog in FIG. 4 is filled with information. The first step is to build a hierarchical view of the classes involved in the connection. The class types involved are determined from the first dialog. In the case of an internal object connection, both sides are views of the same class; the type that this connection is being built for.

Accessing the meta-data database, the attributes, properties and functions that each object can be determined. These elements are added to the view as the user expands expandable nodes. Only the class attribute nodes are expandable unless a function or field has properties. As each node is expanded, the meta-data database is accessed, and the proper sub-tree added to the view. An icon is placed on each line of the tree to inform the user whether that line represents a property, a function, a primitive attribute or a class attribute.

A simple example will make this clear. Suppose that ClassA is being connected to some other class. The definition of ClassA is as follows:

```
class ClassA {
Int i;
ClassB b;
void func(void);
}
class ClassB {
Int x;
Int y;
}
```

A fully expanded view of ClassA would appear in the tree as:

```
[−] [Class] ClassA
    [Primitive] i
    [−] [Class] b
        [Primitive] x
        [Primitive] y
        [Function] func
```

In this tree view, any row can be selected. In fact multiple rows can be selected. This selection triggers the building of the "mappers" list. On select or de-select of either tree, the mappers list is completely rebuilt from scratch. The algorithm for building the list is disclosed in the following pseudo code:

```
leftHandSide = elements selected on the left side tree view
rightHandSide = elements selected on the right side tree view
For All Mapper Classes In the System
    {
    if (mapper->validate(leftHandSide, rightHandSide))
        {
        Add the current mapper name to the mappers list
        }
    }
```

The key point is the validate function. This is a virtual function that nearly every mapper class overrides. It looks at the list of selected elements on each side, and returns true if and only if it can map the two sets of members together. For example, the mapper that attaches fields to functions would return false if no functions were selected on either side. It would also return false if two functions were selected. If multiple items are selected on one side, then a different validate function is called that has a parameter type for dealing with lists of type elements. This way, the mapper doesn't have to implement the more complex validate if it doesn't handle multiple items on either side.

The mapper classes have some functions that are used only during specification of the class in the builder, other functions that are used during execution initialization, probe relocation, and destruction of the connection. Each mapper class also provides a "human readable" version of its name to put into the mappers list (402).

All mapper classes subclass a base EosMapElement class. This class defines default implementations of many of the virtual functions that most mappers override. The default implementation of validate simply returns false as the base class cannot map anything. The base class implementation of the multi-parameter validate also returns false in the base class. The goal is to make simple mappers simple, and to hide the implementation details of the complex mappings with multiple members on each side from these simple mappers. More complex mappers, such as the multiple argument field to function mapping of course has to be intimately familiar with the second form of validate.

When the user selects a particular mapper, and chooses to add it to the list (this can be done by double clicking or selecting an add mapper button) he has the opportunity to edit the properties of the mapper. Although this could be done in any number of ways, in the preferred embodiment, there is a named dialog view associated with each mapper class. This view is brought up for the particular mapper selected, and the user may interact with it. When new mappers are added to the system, a dialog for editing its properties must also be added. Fortunately, due to the use of the user interface technique known as virtual views, this is fairly trivial.

The builder program finally saves the specification of the connection to a resource file containing the table that will be read in by the executing program. The table has a binary format for compact storage and quick loading of the connections.

Conclusions

The user interacts with the invention in the opposite order of that disclosed here. He interacts with the builder, generates the resource file, then calls edit to establish the connection.

Mapping is a unique technology. It allows objects to act independently of each other at a language level and still interact as required at the program level. This provides for the ability to create reusable language level objects to a degree not attainable in standard object oriented languages.

In the drawings and specification, there have been disclosed various preferred embodiments of the invention and, although specific terms are employed, they have been presented by way of example and not limitation. Thus the breath and scope of the present invention should not be limited by any of the above-described embodiments, which should be defined only in accordance with the following claims.

APPENDIX A

Meta-Data

Meta-Data is data that describe data structures. In practice, meta-data lets an object be queried about its class data type, structure and functionality during program execution. For example, an object can be asked what its name is, how many functions it has, or what the name and type of the third field is. An object-oriented language that supports meta-data is said to have reflection, introspection or run-time type information (RTTI). C++ has a proposed RTTI extension, but it has not yet been implemented in most widely available compilers.

Meta-data itself is not a new concept. Whenever compilers scan code and create a symbol table as part of the compilation process, the symbol table is a meta-data database. This meta-data is commonly passed through the compilation process into the executable image of the program and is commonly used by debuggers during program development. However, in many languages, there is no standard way of accessing this information programmatically during program execution. In fact, as programs are prepared for final shipment, this debugging meta-data information is often removed from the program executable as it has no function in the final production program.

SmallTalk, LISP and other interpreted languages typically support meta-data access as an integral part of the language, although the amount and type of meta-data provided varies widely. Most compiled languages such as Pascal, Modula, C and C++ do not provide meta-data. There are of course notable exceptions to this general rule on both sides.

Meta-data is implemented class wide. That is, the data do not vary from object instance to object instance. Therefore, the meta-data can be stored efficiently in efficiently in one location. Also, meta-data is usually treated as read-only, and does not change during execution of the program. Interpreters provide an interesting exception when new code is generated, then executed by the same program without stopping. Dynamic binding and probes, on the other hand, are typically implemented on an instance basis rather than on a class basis.

The meta-data model as provided is extensible. Extensions to the meta-data are called properties. Properties can be applied to classes, fields, functions, mappers and other meta-data elements. The provision of properties allows for users of the system to add new functionality at the language level for various types. Mapper classes can respond to properties by various means. What this means is that a user can add properties to various data types and then respond to those properties within various mappers that he creates. This enables the programmer to enhance the mapper model with yet another degree of freedom. That is, in addition to adding properties to the mapper to establish behavior, properties can also be added to the elements being connected by the mapper.

APPENDIX B

Full Dynamic Binding

Dynamic binding means that during execution of the program an object can be manipulated using the names of its members. For example, fields can be set and queried, and functions can be called by name. Any part of the program can invoke the member function func of class X during program execution on an instance of X without knowing anything but the name of the class and the function. Meta-data is useful in obtaining these names from the object itself C++ uses a linker to do static binding of functions so that the right code is invoked during program execution without knowing the name of the class or function. In many cases, this approach is effective and is always slightly more efficient. However, if you want library code to call functions that are not in the library you may do so easily with dynamic binding.

Dynamic binding is a fairly common feature in computer languages. Again, it is more common in interpreted languages and is often found in the same languages that support meta-data.

C++ has "dynamic binding" through the use of virtual functions. Virtual dynamic binding creates an array of function pointers for each class that has virtual functions. A pointer to this "Vtable" is stored in each object instance as it is constructed. This vtable pointer is used to invoke functions by index through the Vtable. Each subclasses can "override" virtual functions (causing a different function to be inserted in its local vtable) to implement different functionality. The determination of which function is called is therefore based upon the type of the object instance. U.S. Pat. Nos. 5,327,562 and 5,371,891 discuss virtual functions and their implementation in C++ type languages in explicit detail. The dynamic binding discussed herein is resolved at runtime using the names of the class members. Meta-data is required to do the form of dynamic binding discussed here, while it is not necessary to do the C++ type dynamic binding. C++ dynamic binding is strictly inheritance based, while the form discussed here is not. Only the specified functions of C++ classes are virtual, while all enhanced functions (including virtual functions) can be dynamically bound by the present invention.

Recently, it has also become quite common to have some form of dynamic binding for functions incorporated into the operating system software that runs computer systems. Microsoft Windows' Dynamic Link Libraries (DLLs) are a prominent example of one form of non-language based dynamic linking. This type of OS level dynamic linking differs significantly from language based dynamic linking. U.S. Pat. No. 5,369,766 provides an interesting overview of this type of dynamic linking with the added feature that the dynamic linking can be accomplished and relinked without the interruption of program execution. Another type of dynamic linking is described in U.S. Pat. No. 5,339,430 which provides for the ability to change which function is called on an object instance basis for debugging in a continually running system. Again, this type of dynamic linking differs substantially from that available in languages supporting the feature.

APPENDIX C

Probes

The third object-oriented enhancement of interest is probes. Probes are callback functions that are invoked when data (typically in an object field) change. Probes are often planted by other objects, although they can also be set by a class on a member of itself Probes let interested objects oversee the probed data values without the proactive involvement of the object being watched. In other words, the object being probed doesn't need to change its behavior for interested parties to be informed of changes that take place in the object's data. This shifts responsibility for synchronizing the object's behavior with other objects out of the object being probed, thereby simplifying the implementation of the object being probed.

Although meta-data and dynamic binding are implemented in SmallTalk, probes are not. The present invention could be applied to the enhancement of SmallTalk to support probes by one skilled in the art. Similarly, other languages that do not support probing could be enhanced using the present invention.

Probes are a fairly rare feature in programming languages. Although they are quite useful, only a few research languages are known to have direct full support built in. No other implementation of probing is as complete as that described herein.

Probes can be turned on and off during program execution for efficiency purposes. This is often necessary if probed values contain intermediate values during complex recalculations.

The SIMULA programming language has "left-monitored variables", which function similarly to probes except that a single function is associated with the field and that function is attached to that variable for the duration of the object's instantiation. There is no method of turning off the callback during program execution in SIMULA.

Some non-standard versions of Eiffel have a feature called "write barriers" that is also similar to probes. It allows for control over the assignment to variables. However, Eiffel lacks some of the meta-data and dynamic binding features discussed above.

The ability to add additional callbacks to the list of probes on a primitive field which is not a member of a class during execution of the program appears to be unique to the present invention. In other words, although some languages have this feature, it appears that none of them approach the problem in such a dynamic fashion.

A special kind of field called a signal is also provided within the system being used. Signals provide a port for probes to be planted on, but contain no data. The object must explicitly cause probes to be fired on a signal (as no data is there to be changed) but the object has no knowledge of which objects (if any) have planted probes on the signal, thus object independence is maintained. A signal then is simply a convenient way to plant a series of callbacks on an object.

APPENDIX D

Instantiation by Name

Another feature related to dynamic binding is the ability to create a default object by name. That is, there is a function that can be called that will return a newly created instance of any object for which the name of the class is passed in. For example, you could ask the user to type in the name of a class in a type in box, then built an instance of that object using only the name.

Normally code is written to create a specific type, and only one particular class type can be constructed by that code.

The advantages provided by dynamic binding and instantiation by name are similar to those you get by using a phone book. The way compiled languages usually work is similar to the method you use when you memorize your close friends' phone numbers. It is very efficient for those few numbers, but you can only memorize a number if you know up front you'll need it. However, with a phone book, there is a much larger potential number of people you can call. You don't need to "know" the phone number before hand to call them.

APPENDIX E

```
EosMapElement
class EOS_MODIFIER EosMapElement: public EosObject
{
public:
EosMapElement();
EosMapElement(const EosMapElement& orig);
virtual ~EosMapElement();
EosMapElement& operator =(const EosMapElement& orig);
EosInt fMapType; // synchronization direction
EosTypeElementRef fLeftSide; // function field or property fParent object
in
typeelementref. Resolve parent sets parent object when mapping
instantiated.
type element list subclass of typeelement
EosTypeElementRef fRightSide; // EosFieldElement,
EosFunctionElement,
EosPropertyElement, EosTypeElementList OBJECT VIEW MAPPER
goes through list validate. passing intype elements. calls it with two
object arrays.
EosBool fCanMapLeft;
EosBool fCanMapBoth;
EosBool fCanMapRight; // enable disable during edit. Could use
fMapType to do this enabling.
virtual EosTable &getProperties(EosBoolean interactive = eosFalse);
virtual void setProperties(EosTable &table,EosBoolean
interactive = eosFalse);
// during the life of the mapping hookup and unhookup
virtual void insertLeftHandSide(EosProbeObject *leftHandSide);
// hookup, initialization called by edit. EosOVMapEditor for composed
views : EosEditor
insertProbe for mapeditor
if you delete the objectviewmapper returned by edit it shuts down
gracefully.
virtual void insertRightHandSide(EosProbeObject *rightHandSide);
virtual void removeLeftHandSide(EosProbeObject *leftHandSide);
virtual void removeRightHandSide(EosProbeObject *rightHandSide);
// callback funcs to override when map element is interested in a change
of
value of either the left side or the right side
virtual void leftHandSideChanged(EosProbeObject *theObj); // during
processing when a probe fires.
virtual void rightHandSideChanged(EosProbeObject *theObj); // calls
valueChanged
// on switch object it refixes everything.
// validation for map elements
virtual EosBoolean validateType(EosAtom &typeOne,EosAtom
&typeTwo); //
helper for people who write mapper. match of subclass.
EosBoolean validateTypeToNumeric(const EosAtom &type); // can this
match a particular numeric type. (long to int, etc.)
virtual EosBoolean validate(EosTypeElement
*leftHandSide,EosTypeElement
*rightHandside); // build the list. base returns false. validate never gets
called at runtime.
virtual EosBoolean validate(EosObjectArray
&leftHandSide,EosObjectArray
&rightHandSide); // build the list for multiple select. base returns false.
virtual void setTypeElement(EosTypeElement
*leftHandSide,EosTypeElement
*rightHandSide); // only called at design time. Filters arrays changes
function. converts single select.
virtual EosBoolean access(EosTypeElement
*leftHandSide,EosTypeElement
*rightHandSide); // extra system level validate. can call in their validate
to elimmiate totally bogus types of mappers.
EosBoolean canMapLeft();
EosBoolean canMapRight(); // runtime can you connect optimization.
Don't insertProbes on something that doesn't have
void setValueIsChanging(EosBoolean valueIschanging) // block infinite
loops. semaphore. Keep second firing from happening. Optimization and
loop reduction.
EosBoolean getValueIsChanging(void)
virtual EosString getPrintName(); // return human readable name.
virtual EosTypeElement *createTypeElement(EosTable &table); // creates
type element from name
virtual void valueChanged(EosProbeObject *src,EosTypeElement
*srcElement;EosTypeElement *destElement); // override to do
transformation
virtual void init(); // design. Initalizes the view of the properties.
```

APPENDIX E-continued

```
virtual void initProbeValues(); // pings at the start, at the end of edit after
inserting probes calls valueChanged
virtual EosBoolean getExpressionValue(const EosShort &op,const
EosLong
&operand1,const EosLong &operand2); // pass expressions in. select
a>length.
enable/disable expression evaluates the expression.
virtual void typeElementChanged(EosTypeElement
*typeElement,EosProbeObject *parentObject); // if the chain is broken this
gets called. Don't usually override.
virtual void setPropertyTable(EosTable *IspropertyTable,EosTable
*rsPropertyTable); // passes two sides data properties to the mapper.
virtual EosBoolean validateEdit(); // design time. validates bringing down
the editable view of the mapper. Validates the properties of the mapper.
virtual void endEdit(); // cleanup design time. Cleanup all mapper stuff
and build the table.
protected:
void leftHandSideCallback(EosProbeObject *theObj); // probe callback.
multiple triggers handled in subclasses.
void rightHandSideCallback(EosProbeObject *theObj);
EosProbeObject *fLeftSideObject;
EosProbeObject *fRightSideObject;
EosProbeID fLeftSideProbeId; // return from probe setting for removal.
EosProbeID fRightSideProbeId;
EosBoolean fValueIsChanging : 2; // compressor.
};
```

APPENDIX F

Meta-Data for a Field to Field Connection

This meta-data contains the information required to map two EosInt fields of class ProjectFrame named "one" and "two" together as an internal object mapping. The mapper connecting the two fields is EosMapFieldToField.

```
"Simple Connection" eTab
{
 "Interactor Name" ea "Simple Connection"
 "Object Type Name" ea "ProjectFrame"
 "Other Object Type Name" ea "ProjectFrame"
 "Constructor" ea "EosObjectViewMapper"
 "Is Builder View" eb F
 "class" ea "ProjectFrame"
 "Local Descriptor" eTab
 {
  "EosObjectViewMapper" eTab
  {
   "Type Name" ea "EosObjectViewMapper"
   "EosMapChildren" eseq [ 1 eTab
   {
    "Type Name" ea "EosMapFieldToField"
    "LeftSide" eTab
    {
     "Type Name" ea
"EosNumFieldElement"
      "type element Name" ea "one"
      "type element Type" ea "EosInt"
      "type element Declarator" ea
"ProjectFrame"
       "Max Value" f2147483648.0
       "Min Value" f-2147483648.0
     }
     "RightSide" eTab
     {
      "Type Name" ea
"EosNumFieldElement"
       "type element Name" ea "two"
       "type element Type" ea "EosInt"
       "type element Declarator" ea
"ProjectFrame"
        "Max Value" f2147483648.0
        "Min Value" f-2147483648.0
      }
```

-continued

```
    }
   ]
   "Left Side Type Name" ea "ProjectFrame"
   "Right Side Type Name" ea "ProjectFrame"
  }
 }
 "Parent Descriptor" eTab
 {
  "EosViewType" eNum ("EosViewType" 2)
  "Interactor Name" ea "Simple Connection"
  "Palette Bitmap" eBmp "Pal2.0"
  "EosInteractorType" eNum ("EosInteractorType" 3)
 }
}
```

APPENDIX G

Meta-Data for a Function Link

This is the meta-data specifying a EosMapMultiArgFunction link from

```
"Example Function Connection" eTab
{
 "Interactor Name" ea "Example Function Connection"
 "Object Type Name" ea "ProjectFrame"
 "Other Object Type Name" ea "ProjectFrame"
 "Constructor" ea "EosObjectViewMapper"
 "Is Builder View" eb F
 "class" ea "ProjectFrame"
 "Local Descriptor" eTab
 {
  "EosObjectViewMapper" eTab
  {
   "Type Name" ea "EosObjectViewMapper"
   "EosMapChildren" eseq [ 1 eTab
   {
    "Type Name" ea
"EosMapMultiArgFunction"
     "LeftSide" eTab
     {
      "Type Name" ea
"EosNumFieldElement"
       "type element Name" ea "a"
       "type element Type" ea "EosInt"
       "type element Declarator" ea
"ClassA"
       "Object Path" eSeq [ 2 ea
"fclassA" "a" ]
        "Max Value" f2147483648.0
        "Min Value" f-2147483648.0
      }
      "RightSide" eTab
      {
       "Type Name" ea
"EosFunctionElement"
        "type element Name" ea "func"
        "type element Type" ea "int"
        "type element Declarator" ea
"ClassB"
        "Object Path" eSeq [ 2 ea
"fClassB" "func" ]
       }
        "eosMapType" i ]
        "eosTriggerList" eSeq [ 1 s 0 ]
        "eosParameterList" eSeq [ 1 s 0 ]
      }]
      "Left Side Type Name" ea "ProjectFrame"
      "Right Side Type Name" ea "ProjectFrame"
    }
   }
   "Parent Descriptor" eTab
   {
    "EosViewType" eNum ("EosViewType" 2)
```

-continued

"Interactor Name" ea "Example Function Connection"
"Palette Bitmap" eBmp "Pal2.0"
"EosInteractorType" eNum ("EosInteractorType" 3)
}
}

-continued

```
EosTypeElement      *fParentTypeElement;
EosMapElement       *fMapperElement;
EosProbedObjectPath fObjectPath;
};
```

APPENDIX H

EosTypeElement

```
class EOS_MODIFIER EosTypeElement: public EosObject
public:
 EosTypeElement();
 EosTypeElement(const EosTypeElement& orig);
 virtual ~EosTypeElement()
 EosTypeElement& operator =(const EosTypeElement& orig);
 public: virtual EosString getElementName(void);
 public: virtual EosString getTreeElementName(void);
 public: EosAtomString fName;
 public: EosAtomString fTypeName;
 public: EosAtomString fDeclarator;
 public: EosInt fKind;
 public: EosObjectArrayRef fTypeElementList;
public:
 EOS_GET_SDO(EosTypeElement)
 EOS_SET_EQUALTO(EosTypeElement)
 virtual EosBoolean getIsPointer();
 virtual EosElementType getElementType();
 virtual EosTypeElementAccessType access();
 virtual EosBoolean match(EosAtom &type);
 virtual EosBoolean matchType(const EosAtom &typeOne,EosAtom
typeTwo);
  virtual EosProbeObject *getRealprobeObject(EosProbeObject *theObj);
  virtual EosBoolean matchPointer(const EosAtom &type);
  virtual void getCurrentSelectedList(EosObjectArray &selectedList);
  virtual EosBoolean isField();
  // New Stuff
  virtual EosTable &getProperties();
  virtual void setProperties(EosTable &table,EosFunctionDescriptor
*desc = NULL);
  virtual EosBoolean canBeProbed();
  EosBoolean isNumericType();
  // sets fieldInformation on the typeElement
  virtual void setFieldDescriptor(EosFieldDescriptor &field);
  // sets fieldInformation on the typeElement
  virtual void setFunctionDescriptor(EosFunctionDescriptor &function);
  // tells the type element to expand and maintain its children
  virtual void allowExpandedChildren(EosBoolean expand);
  virtual void expandChildrenNow();
  virtual void setParent(EosTypeElement *parentTypeElement);
  virtual void currentElementSelected(EosTypeElement
&typeElement,EosBoolean multipleSelect = eosFalse);
  virtual EosString getInfoString(); // string shown in interface.
  inline EosTypeElement *getParent() {return fParentTypeElement;}
  inline EosProbedObjectPath &getobjectpath() {return fObjectPath;}
  EosClassSDO *getParentSdo();
  virtual void recomputeObjectPath();
  // path functions
  virtual EosProbeObject *getProbeObject();
  virtual void setProbeObjectValue(const EosData &value);
  virtual EosAtom getType();
  virtual void setParentObject(EosProbeObject
*parentObject,EosMapElement
*mapperElement,constEosObjectRef &parentObjectRef);
  inline virtual EosProbeObject *getParentObject() {return fParentObject;}
  virtual void setPropertyTable(EosTable *propertyTable);
  EosBoolean    fNodeWasSelected : 2;
  EosBoolean    fIsPrimitive : 2;
protected:
  void expandedChanged(EosBool &expand);
  void subMemberSelected(EosSignal &select);
  EosProbeObject    *fParentObject;
  EosProbeObject    *fProbeObject;
```

APPENDIX I

Networking Objects

```
class EOS_MODIFIER EosConnection {
public:
  EosConnection();
  virtual ~EOSConnection();
// message types
enum ConnectionType {
  probeFiredType        = 0,
  dataChangedType       = 1,
  connectProbeFieldType    = 2,
  disconnectProbeFieldType = 3,
  probeFieldConnectedType  = 4,
  rootObjectChangedType    = 5,
getFrameworkType       = 6,
};
  // callback registry
virtual long getId(EosProbeObject *idObject);
virtual EosProbeObject *getIdObject(long id);
    virtual void returnId(long id),
// send message functions
virtual void probeFired(long id,const EosData &data);
    virtual void dataChanged(long id,const EosData &data);
    virtual long connectProbeField(long clientId,const EosObject
*root,const EosObjectPath &path,const EosAtom &name,
                 EosData &data);
    virtual void disconnectProbeField(long id);
    virtual void probeFieldConnected(long id,long senderId,const EosData
&data);
    virtual void rootObjectChanged(long id,EosObject *newRoot);
    virtual void dispatch(ConnectionType type,long id);
virtual EosObject *getFramework();
protected:
    EosFreeSeq fCallbacklist;
};
// client proxy class
class EOS_MODIFIER EosProxyProbeObject : public EosProbeObject {
public:
  EosProxyProbeObject(EosConnection *connection,EosObject
*object,const
EosObjectPath &path,const EosAtom &name);
  virtual ~EosProxyProbeObject();
    // sender is EosConnection::probeFired
  virtual void probeFired(const EosData &data);
    // sender is EosConnection::probeFieldConnected
    virtual void probeFieldConnected(long senderId,const EosData &data);
  // called whenever the object changes from above
  virtual void parentChanged(EosConnection *connection,EosObject
*object,const EosObjectPath &path,const EosAtom &name);
    // overrided functions from superclass
  virtual EosData & getEosData(EosData &data) const;
  virtual void    setEosData(const EosData &data);
  virtual EosSDO *eosGetSDO() const {return NULL;}
    inline EosAtom getName() {return fName;}
protected:
            EosAtom              fName;
            long                 fHandleToSelf;
            long                 fHandleToServer;
            EosData              fProbeObjectData;
            EosConnection *fConnection;
};
// probe object server class
class EOS_MODIFIER EosProbeObjectServer : public EosProbeObject {
public:
  EosProbeObjectServer();
  virtual ~EosProbeObjectServer();
    // sender is EosConnection::connectProbeField
    virtual long setupServer(EosConnection *connection,long
clientId,const EosObjectRef &root,const EosObjectPath &path,const
```

-continued

```
EosAtom &name,
        EosData &data),
    // sender is EosConnection::rootObjectChanged
    virtual void rootObjectChanged(EosObjectRef &newRoot);
    // sender is EosConnection::dataChanged
    void dataChanged(const EosData &data);
    void probeObjectChanged(EosProbeObject &po);
    virtual EosSDO *eosGetSDO() const {return NULL;}
protected:
        long                    fHandleToSelf;
        long                    fHandleToClient;
        EosProbedObjectPath     fPath;
        EosObject               *fRoot;
        EosConnection           *fConnection;
        EosProbeID              fProbeId;
        EosProbeObject          *fObjectBeingProbed;
        EosBoolean              fInDataChanged;
};
```

What is claimed is:

1. A system for dynamically linking a first object instance and a second object instance written using a dynamic object-oriented language, comprising at least one semantic link relating said first and said second objects instances through their class interfaces using the dynamic binding capabilities of said first and second objects wherein the semantic link comprises:
   a third object instance that sets at least one probe on a field of the object instance, the probe causing the third object instance to perform an action on the second object instance if the field changes and
   properties controlling the behavior of the third object instance, the properties
   not being changed at runtime and
   being stored separately from program code.

2. The system of claim 1 wherein said first and second objects are the same object instance.

3. The system of claim 1 further comprising a plurality of semantic links and means for creating a connection comprising a named list of said plurality of links.

4. The system of claim 3 further comprising a resource for storing a specification of said connection.

5. The system of claim 4 further comprising means for creating and initializing said connection during program execution in accordance with said specification.

6. The system of claim 3 further comprising means for dynamically creating and destroying said connection during program execution.

7. The system of claim 1 wherein said link performs transformations on information passed between said first and said second objects.

8. The system of claim 1, wherein the first object instance resides on a first machine and the second object instance resides on a second machine, the first machine and the second machine coupled to a computer network.

9. The system of claim 1, wherein the third object instance resides on a third machine, the third machine coupled to the computer network.

10. The system of claim 1, wherein the action comprises setting a field in the second object instance.

11. The system of claim 1, wherein the action comprises calling a function in the second object instance.

12. The system of claim 11, wherein the action comprises setting a field in the second object instance and calling a function in the second object instance.

13. The system of claim 1, wherein the action comprises setting a field in the second object instance and calling a function in the second object instance.

14. The system of claim 1, wherein the third object instance sets a second probe on a field of the second object instance, the second probe causing the third object instance to perform an action on the first object instance if the field of the second object instance is changed.

15. A method of establishing communication between a first object instance and a second object instance, the first object and the second object written using a dynamic object-oriented language, the method comprising:
   instantiating a third object instance, the third object instance having properties that
   are not changed at runtime and
   are stored separately from program code;
   the third object instance setting a first probe on the first object; and
   based on the probe, if a field changes in the first object instance, communicating with the second object instance.

16. The method of claim 15, wherein communicating with the second object instance comprises:
   calling a function in the second object instance.

17. The method of claim 16, wherein calling a function comprises:
   the third object instance collecting parameters from the first object via dynamic binding and
   the third object instance passing the parameters to the function.

18. The method of claim 15, wherein communicating with the second object instance comprises:
   updating a field in the second object instance.

19. The method of claim 15, wherein communicating with the second object instance comprises:
   firing a second probe on a field of the second object instance.

20. The method of claim 15, comprising
   the third object instance setting a second probe on the second object instance and
   based on the second probe, if a field changes in the second object instance, communicating with the first object instance.

21. The method of claim 15, comprising:
   instantiating a plurality of objects instances;
   the object instances in the plurality of object instances setting probes on the first object instance; and
   based on at least a probe in the plurality of probes, if a field changes in the first object instance, communicating with the second object instance.

22. The method of claim 15, comprising:
   the third object instance transforming information passed between the first object instance and the second object instance.

23. The method of claim 15, wherein the first object instance resides on a first machine and the second object instance resides on a second machine, the first machine and the second machine coupled to a computer network.

24. The method of claim 23, wherein the third object instance resides on a third machine, the third machine coupled to the computer network.

25. A method of dynamically linking a first object instance and a second object instance written using a dynamic object-oriented language, the method comprising;
   instantiating a third object instance, the third object instance having properties controlling the behavior of the third object instance, the properties being stored separately from program code;

the third object instance setting a probe on a field of said first object instance, the third object instance setting the probe using a class interface of the first object instance; and the probe causing the third object instance to perform an action an the second object instance if the field changes.

26. The system of claim 25, wherein the action comprises setting a field in the second object instance.

27. The system of claim 25, wherein the action comprises calling a function in the second object instance.

28. The method of claim 27, wherein calling a function comprises:

the third object instance collecting parameters from the first object instance via dynamic binding and the third object instance passing the parameters to the function.

29. The method of claim 25, comprising the third object instance setting a second probe on a field of the second object instance, the second probe causing the third object instance to perform an action on the first object instance if the field of the second object instance is changed.

30. The method of claim 25, comprising:

instantiating a plurality of object instances;

the object instances in the plurality of object instances setting a plurality of probes on fields in object instances from among the first object instance and the second object instance, and probes from among the plurality of probes performing actions on object instances from among the first object instance and the second object instance if respective fields are changed.

31. The method of claim 25, comprising:

the third object instance transforming information passed between one of said first and second object instances and another of said first and second object instances.

32. The method of claim 25, wherein the first object instance resides on a first machine and the second object instance resides on a second machine, the first machine and the second machine coupled to a computer network.

33. The method of claim 32, wherein the third object instance resides on a third machine, the third machine coupled to the computer network.

* * * * *